US00H002264H

(19) United States
(12) Statutory Invention Registration
Gladden et al.

(10) Reg. No.: US H2264 H
(43) Published: Sep. 6, 2011

(54) HUMAN-COMPUTER INTERFACE (HCI) TEST DRIVER

(75) Inventors: Maureen J. Gladden, Beaverdam, VA (US); Jennifer E. O'Leary, Stafford, VA (US); Colleen A. Johnson, Fredericksburg, VA (US); Donald J. Lemoine, Fredericksburg, VA (US); Frank J. Petranka, Fredericksburg, VA (US)

(73) Assignee: The United States of America as represented by the Secretary of the Navy, Washington, DC (US)

(21) Appl. No.: 11/805,266

(22) Filed: May 16, 2007

Related U.S. Application Data

(60) Provisional application No. 60/835,966, filed on Jul. 24, 2006.

(51) Int. Cl.
*G06F 15/173* (2006.01)

(52) U.S. Cl. ..... 709/226

(58) Field of Classification Search ..... 709/226; 707/10

See application file for complete search history.

(56) References Cited

U.S. PATENT DOCUMENTS 5,781,720 A * 7/1998 Parker et al. ..... 714/38
6,028,593 A 2/2000 Rosenberg et al. ..... 345/156
6,057,828 A * 5/2000 Rosenberg et al. ..... 345/156
6,859,819 B1 * 2/2005 Rosenberg et al. ..... 709/203
6,968,370 B2 11/2005 Wu ..... 709/220
2002/0091968 A1 * 7/2002 Moreaux et al. ..... 714/38
2004/0148586 A1 * 7/2004 Gilboa ..... 717/108
2004/0225919 A1 * 11/2004 Reissman et al. ..... 714/38

OTHER PUBLICATIONS

P Virgili, A Versatile PC–Based Human Computer Interface for Robotic Applications, National Research Council, 1997.*

* cited by examiner

*Primary Examiner*—Daniel Pihulic
(74) *Attorney, Agent, or Firm*—Gerhard W. Thielman

(57) ABSTRACT

A method and a system for driving a computer interface for a user is provided. The system includes an interface client having a computer platform, a test driver having software on the computer platform; a window displayed to the interface client, the window providing an interface between the computer platform and the user; and a command file that provides an instruction to the computer interface for executing by the driver software, such that the instruction mimics a user input. The method includes providing instructions through a command file having an instruction for execution on the computer interface, providing driver software to the computer interface, and executing the instruction on the computer interface using the driver software, such that the instruction mimics a user input.

18 Claims, 24 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

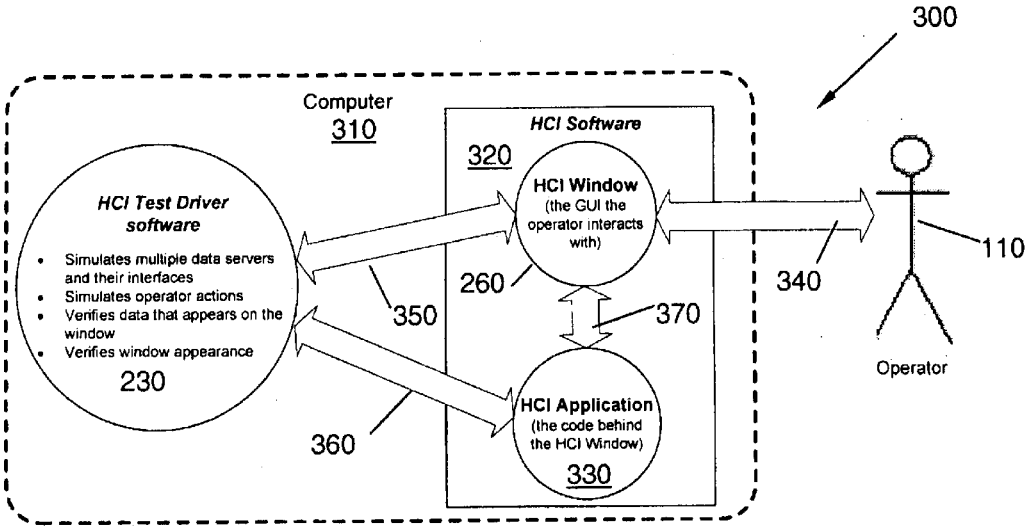

FIG. 3

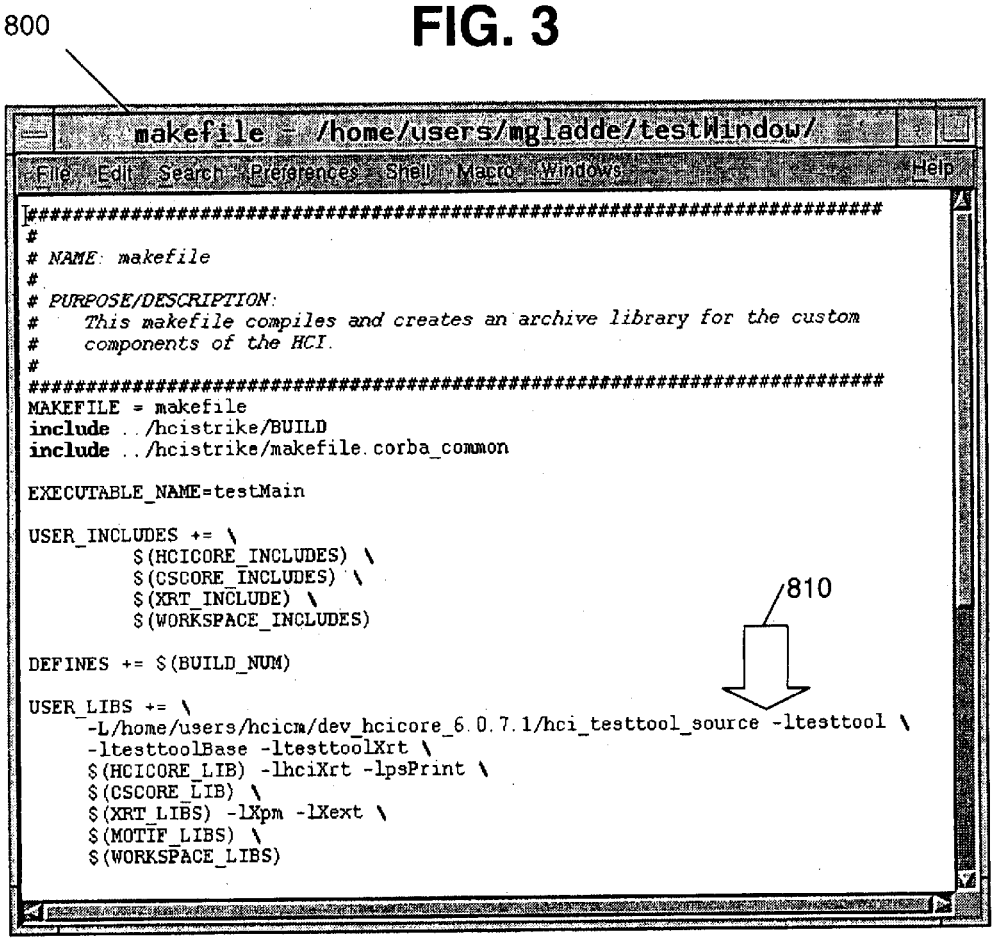

```
##########################################################################
#
# NAME: makefile
#
# PURPOSE/DESCRIPTION:
#     This makefile compiles and creates an archive library for the custom
#     components of the HCI.
#
##########################################################################
MAKEFILE = makefile
include ../hcistrike/BUILD
include ../hcistrike/makefile.corba_common

EXECUTABLE_NAME=testMain

USER_INCLUDES += \
        $(HCICORE_INCLUDES) \
        $(CSCORE_INCLUDES) \
        $(XRT_INCLUDE) \
        $(WORKSPACE_INCLUDES)

DEFINES += $(BUILD_NUM)

USER_LIBS += \
     -L/home/users/hcicm/dev_hcicore_6.0.7.1/hci_testtool_source -ltesttool \
     -ltesttoolBase -ltesttoolXrt \
     $(HCICORE_LIB) -lhciXrt -lpsPrint \
     $(CSCORE_LIB) \
     $(XRT_LIBS) -lXpm -lXext \
     $(MOTIF_LIBS) \
     $(WORKSPACE_LIBS)
```

FIG. 8

400

TestWindowCb.hh - /home/users/mgladde/testWindow/

File Edit Search Preferences Shell Macro Windows Help

```
//-----------------------------------------------------------------------
//
//  NAME: TestWindowCb
//
//  PURPOSE/DESCRIPTION: Handle the display and processing for the Test Window.
//
//-----------------------------------------------------------------------
#ifndef TestWindowCb_H
#define TestWindowCb_H

#include <TestMW.hh>
#include <WindowAccess.hh>

namespace Hci
{
class TestWindowCb : public TestMW, public WindowAccess
{
public:
   // Procedure to Close the Test Window
   void closeWindow(void *clientData);

   // Procedure to Create the Test Window
   void createWindow(void *clientData);

   // Instance of this singleton object
   static TestWindowCb *instance();

   // Procedure to Open Test Window
   void openWindow(void *clientData);

private:
   // Callback for the Hello Push Button
   void helloCallback(Widget, XtPointer, XtPointer);

   // Constructor
   TestWindowCb(const char *name);

   // Destructor
   ~TestWindowCb();


   // Local Variables
   int                 buttonClickCount;
   static TestWindowCb *theInstance;
   string              windowTitle;
};
}
#endif
```

450

430

420

440

460

410

FIG. 4

500

510

TestWindowCb.cc - /home/users/mgladde/testWindow/

File Edit Search Preferences Shell Macro Windows Help

```
//-----------------------------------------------------------------------
//
//  NAME: TestWindowCb
//
//  PURPOSE/DESCRIPTION: Handle the display and processing for the Test Window.
//
//-----------------------------------------------------------------------
#include <Xm/XrtTable.h>
#include <Xm/MwmUtil.h>
#include <HciApp.hh>
#include <MotifUtilities.hh>
#include <TestWindowCb.hh>

namespace Hci
{
// Static Variable Initialization
TestWindowCb *TestWindowCb::theInstance = NULL;

// Procedure to Close the Test Window
void TestWindowCb::closeWindow(void *clientData)
{
   XtPopdown(XtParent(theInstance->_TestMW));
   XtUnmanageChild(theInstance->_TestMW);
}

// Procedure to Create the Test Window
void TestWindowCb::createWindow(void *clientData)
{
   Cardinal ac = 0;
   Arg      args[10];
   HciApp  *hciApp = HciApp::instance();

   // Create the parent shell
   XtSetArg(args[ac],XmNallowShellResize, False); ac++;
   XtSetArg(args[ac], XmNmwmDecorations,
         MWM_DECOR_BORDER +
         MWM_DECOR_TITLE +
         MWM_DECOR_MENU +
         MWM_DECOR_MINIMIZE); ac++;
   XtSetArg(args[ac], XmNmwmFunctions,
         MWM_FUNC_MOVE +
         MWM_FUNC_MINIMIZE +
         MWM_FUNC_CLOSE); ac++;
   createTopLevelShell("testTLS", hciApp->appShell(), args, ac);

   // Call the routine that will construct the window in the parent shell
   create(shellWidget);

   // Set the window's title to Test Window
   windowTitle = "Test Window";
   setWindowTitle(windowTitle);

   buttonClickCount = 0;
}
```

550

530

FIG. 5A

500

520

TestWindowCb.cc - /home/users/mgladde/testWindow/

File Edit Search Preferences Shell Macro Windows Help

```
// Callback for the Hello Push Button
void TestWindowCb::helloCallback
        (Widget w, XtPointer clientData, XtPointer callData)
{
   buttonClickCount++;

   if (buttonClickCount % 2)
   {
      // Change push button label to "Goodbye"
      MotifUtilities::insertStringIntoLabelString(_helloPB, "Goodbye");
   }
   else
   {
      // Change push button label to "Hello!!"
      MotifUtilities::insertStringIntoLabelString(_helloPB, "Hello!!!");
   }
}

// Instance of this singleton object
TestWindowCb *TestWindowCb::instance()
{
   if (NULL == theInstance)
   {
      theInstance = new TestWindowCb("testMW");
   }
   return theInstance;
}

// Procedure to Open Test Window
void TestWindowCb::openWindow(void *clientData)
{
   theInstance->manage();
   XtPopup(XtParent(_TestMW),XtGrabNone);
   XtMapWidget(XtParent(_TestMW));
}

// Constructor
TestWindowCb::TestWindowCb(const char *name) : TestMW(name)
{
}

// Destructor
TestWindowCb::~TestWindowCb()
{
}

}; // end namespace Hci
```

560

570

580

540

FIG. 5B

900

SpecialAction.cc - /home/users/mgladde/testWindow/

File Edit Search Preferences Shell Macro Windows Help

```
//-----------------------------------------------------------------------
//
//  NAME: SpecialAction
//
//-----------------------------------------------------------------------
#if __HP_aCC
#include <iostream.h>
#else
#include <iostream>
#endif
#include <X11/Intrinsic.h>
#include <SpecialAction.hh>

#include <TestWindowCb.hh>

namespace Hci
{
SpecialAction *SpecialAction::specialActionInstance = NULL;

void SpecialAction::callProcedure(vector<string> parmList)
{
   TestWindowCb   *testWindow;

   // parmList[0] contains the whole command line
   // parmList[1] contains "CallProcedure"
   // parmList[2] contains the procedure name

   if (parmList[2].compare("Create_Test_Window") == 0)
   {
      testWindow = TestWindowCb::instance();
      testWindow->createWindow(NULL);
   }
   else if (parmList[2].compare("Open_Test_Window") == 0)
   {
      testWindow = TestWindowCb::instance();
      testWindow->openWindow(NULL);
   }
   else if (parmList[2].compare("Close_Test_Window") == 0)
   {
      testWindow = TestWindowCb::instance();
      testWindow->closeWindow(NULL);
   }
}

SpecialAction *SpecialAction::instance()
{
   if (NULL == specialActionInstance)
   {
      specialActionInstance = new SpecialAction();
   }
   return specialActionInstance;
}

}; // end namespace Hci
```

910

920

930

FIG. 9

1000 test.cmd - /home/users/mgladde/testWindow/

File Edit Search Preferences Shell Macro Windows Help

```
##########################################################################
##
## FILE NAME:  test.cmd
##
## PURPOSE: This command file tests the Test Window.
##
##########################################################################

# Create the Test Window
Call_Procedure Create_Test_Window

# Open the Test Window
Call_Procedure Open_Test_Window

# Press the Hello push button
Press_Button testMW helloPB Activate Left

# Check that it changed to "Goodbye"
Check_Button_Label_String testMW helloPB "Goodbye" \
   True 1 0 helloCallback True True

# Press the Goodbye push button
Press_Button testMW helloPB Activate Left

# Check that it changed to "Hello!!"
Check_Button_Label_String testMW helloPB "Hello!!" \
   True 2 0 helloCallback True True

# Press the Hello push button
Press_Button testMW helloPB Activate Left

# Check that it changed to "Goodbye"
Check_Button_Label_String testMW helloPB "Goodbye" \
   True 3 0 helloCallback True True

# Press the Goodbye push button
Press_Button testMW helloPB Activate Left

# Check that it changed to "Hello!!"
Check_Button_Label_String testMW helloPB "Hello!!" \
   True 4 0 helloCallback True True

# Close the Test Window
Call_Procedure Close_Test_Window

Pause "DONE Testing!"
```

FIG. 10

TestWindowCb.cc - /home/users/mgladde/testWindow/

File Edit Search Preferences Shell Macro Windows Help

1600

530

```
void TestWindowCb::createWindow(void *clientData)
{
   Cardinal ac = 0;
   Arg      args[10];
   HciApp  *hciApp = HciApp::instance();

   // Create the parent shell
   XtSetArg(args[ac],XmNallowShellResize, False); ac++;
   XtSetArg(args[ac], XmNmwmDecorations,
         MWM_DECOR_BORDER +
         MWM_DECOR_TITLE +
         MWM_DECOR_MENU +
         MWM_DECOR_MINIMIZE); ac++;
   XtSetArg(args[ac], XmNmwmFunctions,
         MWM_FUNC_MOVE +
         MWM_FUNC_MINIMIZE +
         MWM_FUNC_CLOSE); ac++;
   createTopLevelShell("testTLS", hciApp->appShell(), args, ac);

   // Call the routine that will construct the window in the parent shell
   create(shellWidget);

   // Set the window's title to Test Window
   windowTitle = "Test Window";
   setWindowTitle(windowTitle);

   buttonClickCount = 0;
}

// Callback for the Hello Push Button
void TestWindowCb::helloCallback
        (Widget w, XtPointer clientData, XtPointer callData)
{
   buttonClickCount++;

   if (buttonClickCount % 2)
   {
      // Change push button label to "Goodbye"
      MotifUtilities::insertStringIntoLabelString(_helloPB, "Goodbye");
   }
   else
   {
      // Change push button label to "Hello!!"
      MotifUtilities::insertStringIntoLabelString(_helloPB, "Hello!!");
   }
}

// Instance of this singleton object
TestWindowCb *TestWindowCb::instance()
{
   if (NULL == theInstance)
   {
      theInstance = new TestWindowCb("testMW");
   }
   return theInstance;
}
```

560

1610

1620

FIG. 16

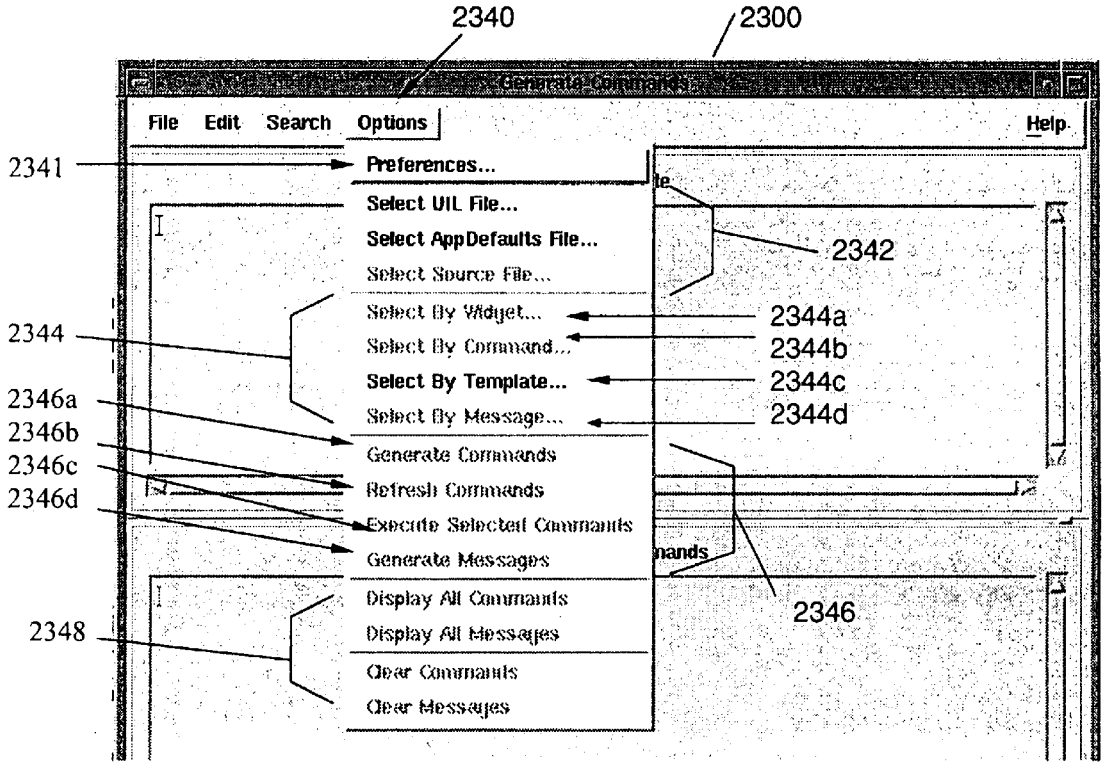

FIG. 23E a.) Enter_Text – Used to enter text in a text widget.
b.) Move_Pointer_To_Widget – Simulates the user moving the cursor to a widget.
c.) MWM_Close - Close a window.
d.) MWM_Iconify - Iconify a window.
e.) MWM_Lower - Lower a window.
f.) Press_And_Release_Button – Used to simulate the operator pressing a push button or toggle button.
g.) Press_Button – Used to simulate the operator pressing (but not releasing) a push button or toggle button.
h.) Press_Button_On_Dialog – Simulates the pressing of a button on a dialog.
i.) Press_Button_On_Options_Menu – Simulates the pressing of a button on an options menu.
j.) Press_Button_On_Popup_Menu – Simulates the pressing of a button on a popup menu.
k.) Press_Button_On_Pulldown_Menu – Simulates the pressing of a button on a pulldown menu.
l.) Press_Options_Cascade_Button – Simulates the pressing of a cascade button on an options menu.
m.) Press_Popup_Cascade_Button – Simulates the pressing of a cascade button on an popup menu.
n.) Press_Pulldown_Cascade_Button – Simulates the pressing of a cascade button on a pulldown menu.
o.) Release_Button – Simulates the releasing of a button.
p.) Scroll – Simulates the selection of a scroll bar.
q.) Select_Visible_XRT_Items – Simulates the selection of visible items in an Xrt List.
r.) Set_Active_Tab – Sets the active tab.
s.) Select_XRT_Items – Simulates the selection of items in an Xrt List.

FIG. 33

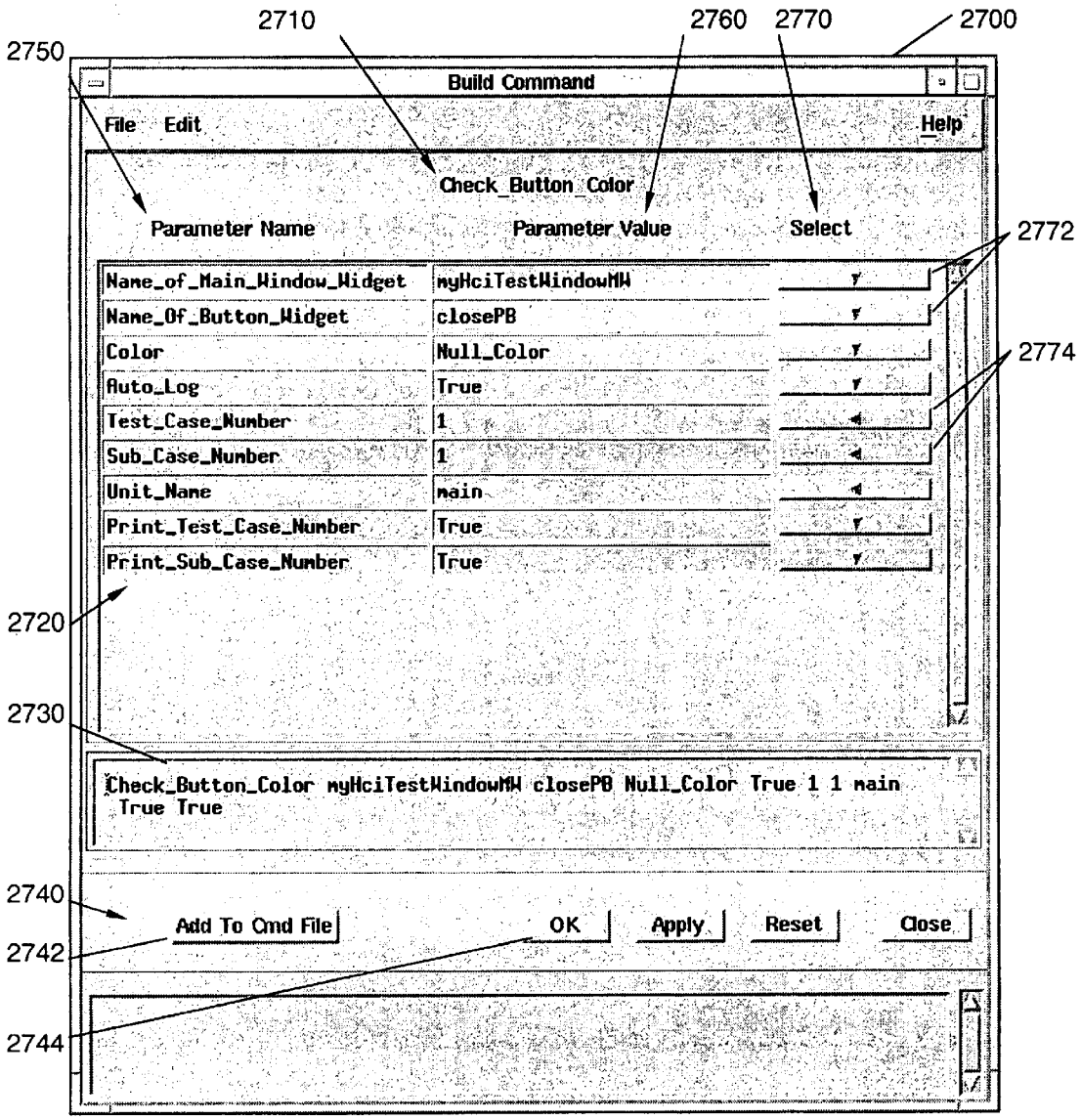

FIG. 27 a.) Set_Demo_Mode – Sets demo mode to on or off.
b.) Set_Environment_Variable – Sets an environment variable.
c.) Set_Flag – Sets a flag to a given value.
d.) Set_Pause_Mode – Sets pause to on or off.
e.) Set_Pixels_To_Skip – Sets the number of pixels to skip when moving the mouse (for smooth mouse movements use a small value).
f.) Set_Pointer_Speed – Sets the speed of mouse movement (0 – 100)
g.) Set_Prompt_Mode – Sets prompt mode to on or off.
h.) Set_Send_To_Hci_Command_Alias – Defines an alias command for sending a message to Hci.
i.) Set_Test_Window_Visible – Shows or hides the test window.

FIG. 32 a.) Check_Background_Pixmap – Determines if the background pixmap of a button is an expected value.
b.) Check_Button_Color – Determines if the background color of a button is an expected value.
c.) Check_Button_Sensitivity – Determines if a button is sensitive or not.
d.) Check_Cell_Pixmap - Determines if the pixmap in an XRT Table cell matches an expected value.
e.) Check_Dialog_Button_Label – Determines if the label of a button in a dialog matches an expected value.
f.) Check_Dialog_Message_String – Determines if the message string matches an expected value.
g.) Check_From_HCI_Message – Checks the next message to be displayed in the "From HCI" area with a list of expected strings.
h.) Check_To_HCI_Message – Checks the next message to be displayed in the "To HCI" area with a list of expected strings.
i.) Check_Help_Text – Checks the context sensitive help text for a widget.
j.) Check_Is_Editable – Checks if a text widget is editable or not.
k.) Check_Is_Managed – Checks if a widget is managed or not.
l.) Check_Label_Pixmap – Determines if the pixmap in a label widget matches an expected value.
m.) Check_Label_String – Determines if string in a label widget matches an expected value.
n.) Check_List_Items – Determines if the items in a List Widget match expected values.
o.) Check_List_Num_Rows – Determines if the number of items in a List Widget matches an expected value.
p.) Check_Menu_History – Determines if the menu history for an options menu matches an expected value.
q.) Check_No_Message – Determines if message was not sent from HCI.
r.) Check_Sort_Button_State – Determines if the state of a sort button matches an expected state of Dynamic, Static, or Unsorted.
s.) Check_Text_String – Determines if string in a text widget matches an expected value.
t.) Check_Top_Shadow_Color – Determines if the top shadow color of a widget matches an expected value.
u.) Check_Widget_Position – Determines if the position of a widget matches an expected value.
v.) Check_Window_Title – Determines if the title of a window matches an expected value.
w.) Check_XRT_Button_Pixmap – Determines if the pixmap associated with an XRT Button matches an expected value.
x.) Check_XRT_Cell_Background_– Color Determines if a the background color of an XRT cell matches an expected value.
y.) Check_XRT_Cell_Pixel_Height – Determines if the cell pixel height matches an expected value.
z.) Check_XRT_Cell_Pixel_Width – Determines if the cell pixel width matches an expected value.
aa.) Check_XRT_Cell_Value – Determines if a cell value in an XRT Table matches an expected value.
bb.) Check_XRT_Cell_Visibility – Determines if a cell is visible or not.
cc.) Check_XRT_Column_Pixel_Width – Determines if the column pixel height matches an expected value.
dd.) Check_XRT_Num_Columns – Determines if the number of columns in an XRT Table matches an expected value.
ee.) Check_XRT_Num_Rows – Determines if the number of rows in an XRT Table matches an expected value.
ff.) Check_XRT_Range_Selected – Determines if the selected range matches an expected selected range.
gg.) Check_XRT_Range_Unselected – Determines if the unselected range matches an expected unselected range.
hh.) Check_XRT_Row_Pixel_Height – Determines if the row pixel height matches an expected value.
ii.) Check_XRT_Rows_Selected – Determines if the currently selected rows in an XRT Table match expected selected rows.
jj.) Check_XRT_Rows_Unselected – Determines if the given set of rows in an XRT Table are unselected.
kk.) Check_XRT_Sort_Order – Determines if the values in a given column of an XRT Table match expected values.

FIG. 29 a.) Call_Procedure – Calls the named procedure defined in the SpecialAction class. The procedure can access parameters from the command line.
b.) Debug_Mode_On – Used to debug a command file. Provides additional standard output.
c.) Debug_Mode_Off – Turns off debugging.
d.) Delay – Used to delay processing by a specified number of milliseconds. A timer is scheduled such that processing of the next command is delayed until the number of milliseconds has expired.
e.) Edit_Res_Check – Allows the use of the editres utility to retrieve a widget tree of the window being tested.
f.) If_Flag_I_Equal – Used to test the value of a flag set in the command file.
g.) If_User_Response – Compares a user response to an expected response. If the two match, then the Command_Line is executed. This directive is used in conjunction with the two prompt directives.
h.) Pause – Used to pause the command file.
i.) Print_Unit_Test_Status – Prints the status of a test.
j.) Prompt_Y_N – Prompts the tester for a "Yes" or "No" response.
k.) Put_Line – Output a line to the prompt area.
l.) Put_Line_After_Clear – Clear and output a line to the prompt area.
m.) Put_Line_StdOut – Output a line to standard out.
n.) Quit_Test_Window – Terminate the program.
o.) Record_Messages. Records messages displayed in the paned window areas.
p.) Skip_Command_Line – Directs the command processor to skip or process command lines.

FIG. 30 a) Close_Unit_Test_Log_File
b) Insert_Command_File {Command File Name}
c) Set_Unit_Test_Log_File {Log File Name} {Package Name} {Tester Name} {STR}

FIG. 31 n.) Check_Background_Pixmap
{Name of Main Window Widget}
{Name of Button Widget} {Pixmap}
{Auto Log} {Test Case Number}
{Sub Case Number} {Unit Name}
{Print Test Case Number} {Print Sub Case Number} o.) Check_Button_Color
{Name of Main Window Widget}
{Name of Button Widget} {Color}
{Auto Log} {Test Case Number}
{Sub Case Number} {Unit Name}
{Print Test Case Number} {Print Sub Case Number} p.) Check_Button_Sensitivity
{Name of Main Window Widget}
{Name of Button Widget} {True/False}
{Auto Log} {Test Case Number}
{Sub Case Number} {Unit Name}
{Print Test Case Number} {Print Sub Case Number} q.) Check_Cell_Pixmap
{Name of Window Shell} {Name of XRT Widget}
{Row} {Column} {Pixmap Type}
{Auto Log} {Test Case Number}
{Sub Case Number} {Unit Name}
{Print Test Case Number} {Print Sub Case Number} r.) Check_Dialog_Button_Label
{Name of Dialog Shell}
{Name of Message Box}
{Dialog Button} {Label Value}
{Auto Log} {Test Case Number}
{Sub Case Number} {Unit Name}
{Print Test Case Number} {Print Sub Case Number} s.) Check_Dialog_Message_String
{Name of Dialog Shell}
{Name of Message Box} {Message String}
{Auto Log} {Test Case Number}
{Sub Case Number} {Unit Name}
{Print Test Case Number} {Print Sub Case Number} t.) Check_From_HCI_Message
{Number of Lines}
{Text for line 1} {Text for line 2} ...
{Text for line n}
{Auto Log} {Test Case Number}
{Sub Case Number} {Unit Name}
{Print Test Case Number} {Print Sub Case Number} u.) Check_Help_Text
{Name of Main Window Widget} {Name of Widget}
{Help Text String}
{Auto Log} {Test Case Number}
{Sub Case Number} {Unit Name}
{Print Test Case Number} {Print Sub Case Number} v.) Check_Is_Editable
{Name of Main Window Widget}
{Name of Text Widget} {True/False}
{Auto Log} {Test Case Number}
{Sub Case Number} {Unit Name}
{Print Test Case Number} {Print Sub Case Number} w.) Check_Is_Managed
{Name of Main Window Widget} {Name of Widget}
{True/False}
{Auto Log} {Test Case Number}
{Sub Case Number} {Unit Name}
{Print Test Case Number} {Print Sub Case Number} x.) Check_Is_Mapped
{Name of Main Window Widget} {Name of Widget}
{True/False}
{Auto Log} {Test Case Number}
{Sub Case Number} {Unit Name}
{Print Test Case Number} {Print Sub Case Number} y.) Check_Label_Pixmap
{Name of Main Window Widget}
{Name of Label Widget} {Pixmap Type}
{Auto Log} {Test Case Number}
{Sub Case Number} {Unit Name}
{Print Test Case Number} {Print Sub Case Number} z.) Check_Label_String
{Name of Main Window Widget}
{Name of Label Widget}
{Label Value} {Auto Log} {Test Case Number}
{Sub Case Number} {Unit Name}
{Print Test Case Number} {Print Sub Case Number}

FIG. 34A a.) Check_List_Items
{Name of Main Window Widget}
{Name of List Widget}
{Number of Rows}
{Starting Row} {Ending Row}
{Row a Value} {Row b Value} ... {Row n Value}
{Label Value} {Auto Log} {Test Case Number}
{Sub Case Number} {Unit Name}
{Print Test Case Number} {Print Sub Case Number} b.) Check_List_Num_Rows
{Name of Main Window Widget}
{Name of List Widget}
{Number of Rows} {Auto Log} {Test Case Number}
{Sub Case Number} {Unit Name}
{Print Test Case Number} {Print Sub Case Number} c.) Check_Menu_History
{Name of Main Window Widget}
{Name of Options Menu Widget}
{Name of Button Widget}
{Auto Log} {Test Case Number}
{Sub Case Number} {Unit Name}
{Print Test Case Number} {Print Sub Case Number} d.) Check_No_Message
{Check Command}
{Auto Log} {Test Case Number}
{Sub Case Number} {Unit Name}
{Print Test Case Number} {Print Sub Case Number} e.) Check_Sort_Button_State
{Name of Main Window Widget}
{Name of Sort Button Widget} {Sort State}
{Auto Log} {Test Case Number}
{Sub Case Number} {Unit Name}
{Print Test Case Number} {Print Sub Case Number} f.) Check_Text_String
{Name of Main Window Widget}
{Name of Text Widget}
{Text String} {Auto Log} {Test Case Number}
{Sub Case Number} {Unit Name}
{Print Test Case Number} {Print Sub Case Number} g.) Check_To_HCI_Message
{Number of Lines}
{Text for line 1} {Text for line 2} ...
{Text for line n}
{Auto Log} {Test Case Number}
{Sub Case Number} {Unit Name}
{Print Test Case Number} {Print Sub Case Number} h.) Check_Top_Shadow_Color
{Name of Main Window Widget}
{Name of Widget} {Color}
{Auto Log} {Test Case Number}
{Sub Case Number} {Unit Name}
{Print Test Case Number} {Print Sub Case Number} i.) Check_Widget_Position
{Name of Main Window Widget}
{Name of Widget}
{Position} {Auto Log} {Test Case Number}
{Sub Case Number} {Unit Name}
{Print Test Case Number} {Print Sub Case Number} j.) Check_Window_Title
{Name of Window Shell} {Title}
{Auto Log} {Test Case Number}
{Sub Case Number} {Unit Name}
{Print Test Case Number} {Print Sub Case Number} k.) Check_XRT_Button_Pixmap
{Name of Window Shell} {Name of XRT Button Widget}
{Pixmap}
{Color} {Auto Log} {Test Case Number}
{Sub Case Number} {Unit Name}
{Print Test Case Number} {Print Sub Case Number} l.) Check_XRT_Cell_Background_Color
{Name of Window Shell} {Name of XRT Widget}
{Row} {Column}
{Color} {Auto Log} {Test Case Number}
{Sub Case Number} {Unit Name}
{Print Test Case Number} {Print Sub Case Number} m.) Check_XRT_Cell_Pixel_Height
{Name of Window Shell} {Name of XRT Widget}
{Row} {Column}
{Pixel Height} {Auto Log} {Test Case Number}
{Sub Case Number} {Unit Name}
{Print Test Case Number} {Print Sub Case Number}
{Print Test Case Number} {Print Sub Case Number}

FIG. 34B aa.) Check_XRT_Cell_Pixel_Width
{Name of Window Shell} {Name of XRT Widget}
{Row} {Column}
{Pixel Width} {Auto Log} {Test Case Number}
{Sub Case Number} {Unit Name}
{Print Test Case Number} {Print Sub Case Number} bb.) Check_XRT_Cell_Value
{Name of Window Shell} {Name of XRT Widget}
{Row} {Column}
{Cell Value} {Auto Log} {Test Case Number}
{Sub Case Number} {Unit Name}
{Print Test Case Number} {Print Sub Case Number} cc.) Check_XRT_Cell_Visibility
{Name of Window Shell} {Name of XRT Widget}
{Row} {Column}
{Cell Visibility} {Auto Log} {Test Case Number}
{Sub Case Number} {Unit Name}
{Print Test Case Number} {Print Sub Case Number} dd.) Check_XRT_Column_Pixel_Width
{Name of Window Shell} {Name of XRT Widget}
{Row} {Column}
{Pixel Width} {Auto Log} {Test Case Number}
{Sub Case Number} {Unit Name}
{Print Test Case Number} {Print Sub Case Number} ee.) Check_XRT_Num_Columns
{Name of Window Shell} {Name of XRT Widget}
{Row} {Column}
{Number of Columns} {Auto Log} {Test Case Number}
{Sub Case Number} {Unit Name}
{Print Test Case Number} {Print Sub Case Number} ff.) Check_XRT_Num_Rows
{Name of Window Shell} {Name of XRT Widget}
{Number of Rows}
{Auto Log} {Test Case Number}
{Sub Case Number} {Unit Name}
{Print Test Case Number} {Print Sub Case Number} gg.) Check_XRT_Range_Selected
{Name of Window Shell} {Name of XRT Widget}
{First Row} {Last Row}
{Auto Log} {Test Case Number}
{Sub Case Number} {Unit Name}
{Print Test Case Number} {Print Sub Case Number} hh.) Check_XRT_Range_Unselected
{Name of Window Shell} {Name of XRT Widget}
{First Row} {Last Row}
{Auto Log} {Test Case Number}
{Sub Case Number} {Unit Name}
{Print Test Case Number} {Print Sub Case Number} ii.) Check_XRT_Row_Pixel_Height
{Name of Window Shell} {Name of XRT Widget}
{Row} {Pixel Height}
{Auto Log} {Test Case Number}
{Sub Case Number} {Unit Name}
{Print Test Case Number} {Print Sub Case Number} jj.) Check_XRT_Rows_Selected
{Name of Window Shell} {Name of XRT Widget}
{Number Selected} {Row a} {Row b} ... {Row n}
{Auto Log} {Test Case Number}
{Sub Case Number} {Unit Name}
{Print Test Case Number} {Print Sub Case Number} kk.) Check_XRT_Rows_Unselected
{Name of Window Shell} {Name of XRT Widget}
{Number Selected} {Row a} {Row b} ... {Row n}
{Auto Log} {Test Case Number}
{Sub Case Number} {Unit Name}
{Print Test Case Number} {Print Sub Case Number} ll.) Check_XRT_Sort_Order
{Name of Window Shell} {Name of XRT Widget}
{Column} {Number Of Rows}
{Row a Cell Value} {Row b Cell Value} ...
{Row n Cell Value} {Auto Log} {Test Case Number}
{Sub Case Number} {Unit Name}
{Print Test Case Number} {Print Sub Case Number} mm.) Check_XRT_Range_Selected
{Name of Window Shell} {Name of XRT Widget}
{First Row} {Last Row}
{Auto Log} {Test Case Number}
{Sub Case Number} {Unit Name}
{Print Test Case Number} {Print Sub Case Number}

FIG. 34C nn.) Check_XRT_Range_Selected
{Name of Window Shell} {Name of XRT Widget}
{First Row} {Last Row}
{Auto Log} {Test Case Number}
{Sub Case Number} {Unit Name}
{Print Test Case Number} {Print Sub Case Number} oo.) Check_XRT_Range_Unselected
{Name of Window Shell} {Name of XRT Widget}
{First Row} {Last Row}
{Auto Log} {Test Case Number}
{Sub Case Number} {Unit Name}
{Print Test Case Number} {Print Sub Case Number} pp.) Check_XRT_Row_Pixel_Height
{Name of Window Shell} {Name of XRT Widget}
{Row} {Pixel Height}
{Auto Log} {Test Case Number}
{Sub Case Number} {Unit Name}
{Print Test Case Number} {Print Sub Case Number} qq.) Check_XRT_Rows_Selected
{Name of Window Shell} {Name of XRT Widget}
{Number Selected} {Row a} {Row b} ... {Row n}
{Auto Log} {Test Case Number}
{Sub Case Number} {Unit Name}
{Print Test Case Number} {Print Sub Case Number} rr.) Check_XRT_Rows_Unselected
{Name of Window Shell} {Name of XRT Widget}
{Number Selected} {Row a} {Row b} ... {Row n}
{Auto Log} {Test Case Number}
{Sub Case Number} {Unit Name}
{Print Test Case Number} {Print Sub Case Number} ss.) Check_XRT_Sort_Order
{Name of Window Shell} {Name of XRT Widget}
{Column} {Number Of Rows}
{Row a Cell Value} {Row b Cell Value} ...
{Row n Cell Value} {Auto Log} {Test Case Number}
{Sub Case Number} {Unit Name}
{Print Test Case Number} {Print Sub Case Number}

FIG. 34D a.) Call_Procedure {Special Action Procedure Name} {Optional Parameters}
b.) Debug_Mode_On (no parameters)
c.) Debug_Mode_Off (no parameters
d.) Delay {Number of Milliseconds}
e.) Edit_Res_Check HciTestDriverWindow
f.) If_Flag_Is_Equal {Flag name} {Flag Value}
g.) If_User_Response {True Response}
h.) Pause {Text}
i.) Print_Unit_Test_Status {Test_Case_Number} {Test_Subcase_Number}
j.) Prompt_Y_N {Prompt String}
k.) Put_Line {Text String}
l.) Put_Line_After_Clear {Text String}
m.) Put_Line_StdOut {Text String}
n.) Quit_Test_Window (no parameters)
o.) Record_Messages {Record Type} {Record Option} {File Name}
p.) Skip_Command_Line {Boolean Value}

FIG. 35 a) Close_Unit_Test_Log_File
b) Insert_Command_File {Command File Name}
c) Set_Unit_Test_Log_File {Log File Name} {Package Name} {Tester Name} {STR}

FIG. 36 a.) Send_To_Hci_Message {Message To Send} {Message Parameters}

FIG. 37 a.) Set_Demo_Mode {Boolean Value}
b.) Set_Environment_Variable {Environment_Variable} {Value}
c.) Set_Flag {Flag_Name} {Flag Value}
d.) Set_Pause_Mode {Boolean Value}
e.) Set_Pixels_To_Skip {Number of Pixels}
f.) Set_Pointer_Speed {Pointer Speed}
g.) Set_Prompt_Mode {Boolean Value}

FIG. 38

{SM Message} is the message to send to SM;

{Scroll Direction} is Up or Down;

{Set_Group_ID} sets group ID for a file (True/False);

{Set_User_ID} sets user ID for a file (True/False);

{Sort State} is Dynamic, Static, or Unsorted;

{Special Action Procedure Name} is the name of the special action procedure;

{STR} System Trouble Report under test;

{Sub Case Number} is the sub case number;

{Test Case Number} is the test case number;

{Tester Name} name of tester;

{Text for line n} is the expected text of a message to appear in the "From HCI" area of the Hci Test Driver Window.

{Text String} is the value of the text (string);

{True Response} response from user prompt (Normally Y or N);

{Type of Callback} is "Activate" for push buttons, "Value_Changed" for toggle buttons, or "Help" for the help callback.

{Unit Name} is the name of the tested unit.

FIG. 40C a.) Enter_Text
{Name of Main Window Widget}
{Name of Text Widget}
{Text String}
b.) Move_Pointer_To_Widget
{Name of Main Window Widget}
{Name of Widget}
c.) MWM_Close {Name of Main Window Widget}
d.) MWM_Iconify {Name of Main Window Widget}
e.) MWM_Lower {Name of Main Window Widget}
f.) Press_And_Release_Button
{Name of Main Window Widget}
{Name of Button Widget} {Type of Callback}
{Mouse Button to Press}
g.) Press_Button
{Name of Main Window Widget}
{Name of Button Widget} {Type of Callback}
{Button to Press}
h.) Press_Button_On_Dialog
{Name of Main Window Widget}
{Name of Dialog Shell}
{Name of Message Box}
{Button to Press}
i.) Press_Button_On_Options_Menu
{Name of Main Window Widget}
{Name of Options Menu Widget}
{Name of Button Widget}
j.) Press_Button_On_Popup_Menu
{Name of Main Window Widget}
{Name of Popup Menu Widget}
{Name of Button Widget}
k.) Press_Button_On_Pulldown_Menu
{Name of Main Window Widget}
{Name of Pulldown Menu Widget}
{Name of Button Widget}
l.) Press_Options_Cascade_Button
{Name of Main Window Widget}
{Name of Options Menu Widget}
{Name of Button Widget}
{Number Of Cascade Buttons}
{Name of Cascade Button 1}
{Name of Cascade Button 2}
...
{Name of Cascade Button n}
m.) Press_Popup_Cascade_Button
{Name of Main Window Widget}
{Name of Popup Menu Widget}
{Name of Button Widget}
{Number Of Cascade Buttons}
{Name of Cascade Button 1}
{Name of Cascade Button 2}
...
{Name of Cascade Button n}
n.) Press_Pulldown_Cascade_Button
{Name of Main Window Widget}
{Name of Pulldown Menu Widget}
{Name of Button Widget}
{Number Of Cascade Buttons}
{Name of Cascade Button 1}
{Name of Cascade Button 2}
...
{Name of Cascade Button n}
o.) Select_Visible_XRT_Items
{Name of Window Shell}
{Name of XRT Widget}
{Number to select} {Row a} {Row b} ...{Row n}
p.) Select_XRT_Items {Name of Window Shell}
{Name of XRT Widget}
{Number to select} {Row a} {Row b} ...{Row n}
q.) Set_Active_Tab {Name of Window Shell}
{Name of XRT Tab Manager}
{Page Number}

FIG. 39

{Auto Log} is True/False;

{Boolean Value} is True/False;

{Button To Press} is:
XmDIALOG_CANCEL_BUTTON
XmDIALOG_DEFAULT_BUTTON
XmDIALOG_HELP_BUTTON
XmDIALOG_MESSAGE_BUTTON
XmDIALOG_OK_BUTTON {Cell Value} is a string containing the expected contents of an XRT Table cell;

{Cell Visibility} is True/False;

{Check Command} is Start or End.

{Color} See Color_Type in Color_Package;

{Column} is the XRT Table column number;

{Command File Name} is the name of the command file;

{Dialog Button} is:
XmDIALOG_CANCEL_BUTTON
XmDIALOG_DEFAULT_BUTTON
XmDIALOG_HELP_BUTTON
XmDIALOG_MESSAGE_BUTTON
XmDIALOG_OK_BUTTON {File Name} is the name of the file (environment variables are permitted for rename or delete_file);

{Flag name} name of the flag;

{Flag Value} flag value;

{Group_Execute} sets "group" execute permission for a file (True/False);

{Group_Read} sets "group" read permission for a file (True/False);

{Group_Write} sets "group" write permission for a file (True/False);

{Label Value} is the value of the label (string);

{Lc Message} is the Lc message (See HCI Interface Types);

{Log File Name} is the name of the log file;

{Message Object} is the message object (See HCI Interface Types);

{Message Parameters} see HCI Interface Types;

{Message String} is the expected message string (it is not necessary to specify the entire string, the length of the given string will be compared with the message string in the dialog of the same length;

{Mouse button to press} is Left, Middle, or Right;

{Name of Button Widget} is the name of the button widget;

{Name of Cascade Menu Widget} is the name of the cascade menu widget;

{Number of Clicks} is the number of increments to scroll up or down;

{Name of Dialog Shell} is one of the following:
GenericDialogError
GenericDialogInformation
GenericDialogMessage
GenericDialogQuestion
GenericDialogWarning
GenericDialogWorking {Name of Label Widget} is the name of the label widget;

{Name of Main Window Widget} is the name of the Main Window;

{Name of Message Box} is the name of the message box. For the Motif_Utilities.Display_Generic_Dialog service, the value is always "messageBox";

FIG. 40A

{Name of Options Menu Widget} is the name of the options menu widget;

{Name of Scroll Bar widget} is the name of the Scroll Bar widget;

{Name of Sort Button Widget} is the name of the sort button widget;

{Name of Text Widget} is the name of the text widget;

{Name of Widget} is the name of the widget;

{Name of Window Shell} is the name of the window shell;

{Name of XRT Button Widget} is the name of the XRT Button widget;

{Name of XRT Widget} is the name of the XRT table widget;

{New File Name} is the new name of the file (environment variables are permitted);

{Number of Milliseconds} is the number of milliseconds;

{Number of Pixels} is the number of pixels to skip between pointer move intervals (default is 5).

{Number of Rows} is the expected number of rows in an XRT table widget;

{Number Selected} is the expected number of selected rows in an XRT table widget;

{Old File Name} is the original name of the file (environment variables are permitted);

{Others_Execute} sets "others" execute permission for a file (True/False);

{Others_Read} sets "others" read permission for a file (True/False);

{Others_Write} sets "others" write permission for a file (True/False);

{Owner_Execute} sets "owner" execute permission for a file (True/False);

{Owner_Read} sets "owner" read permission for a file (True/False);

{Owner_Write} sets "owner" write permission for a file (True/False);

{Package Name} is the name of the package under test;

{Page Number} is the page number of the tab (starting at 0);

{Pixmap Type} is the pixmap (See Color_Package.Pixmap_Type);

{Pointer Speed} is a number between 1 and 100 with 1 being the slowest and 100 being the fastest.

{Platform Type} VLS or WCM;

{Position} is
Bottom_Position
Left_Position
Right_Position
Top_Position

{Print Sub Case Number} is True/False;

{Print Test Case Number} is True/False;

{Prompt String} string to display at a prompt;

{Record Option} ON/OFF

{Record Type} is one of the following:
From_HCI
From_LC
Cmdlines
Prompts
Checklog {Row} is the XRT Table row number;

{Send Command} is the command to use to send a message for an interface;

FIG. 40B

HUMAN-COMPUTER INTERFACE (HCI) TEST DRIVER

CROSS-REFERENCE TO RELATED APPLICATION

Pursuant to 35 U.S.C. §119, the benefit of priority from Provisional Application No. 60/835,966, with a filing date of Jul. 24, 2006, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to software integration verification. In particular, the invention relates to using a command file and optionally user interaction to represent the inputs from an operator and/or external subsystems. The effects of the inputs on the HCI software are validated against expected responses.

Modern operational control, such as for a ship-board combat platform, typically requires an integrated computer system to receive data, select appropriate options and transmit instructions to and from components for instrumentation and execution. Construction of such a system can require integration of many separate processes, each receiving and transmitting data in coöperation with other related processes.

In addition to creation and assembly of hardware electronic components for receiving information and transmitting commands, software code must be prepared and compiled to interpret and execute instructions that perform the system operations. Prior to complete integration, verification of separate components is performed by a testing operator in combination with simulation software processes. The development alone of the simulation software itself is immense and may become necessary at an early stage in the development cycle. The time and effort required of the testing operator to completely verify the software component is extensive to cover the plethora of different input combinations. This represents a time-consuming and error-prone process.

Such component operation testing typically involves executing the component's instruction software and simulating its external subsystems from which to receive anticipated input and submit appropriate output. Such code must be sufficiently robust to not only properly execute the intended functions on command, but also recover gracefully from inappropriate inputs and other faulty conditions without undue and potentially catastrophic interruption. The simulation procedure involves preparing a test driver to be executed under sets of conditions and selections.

The production software, as well as the simulation software, requires a graphical user interface (GUI). The program renders its GUI to respond to user interaction (e.g., weapon selection) while concurrently operating another device (e.g., tracking a target). Execution of a software application involves kernel scheduling, such as by an operating system process or by a thread of execution. A process is used to instantiate (i.e., run an instance of) a program.

Processors typically operate independently and carry extensive state information regarding operation status (e.g., running, blocked, ready). By contrast, threads share the state information of a single process, memory, address space and other resources with each other. A process switches between threads, whereas multiple threads switch by time slicing. Multi-threading between threads is generally faster than context switching between processes, providing a speed advantage on a cluster of machines. Implementing threads may require careful scheduling to rendezvous properly for processing data in the correct order.

Conventional methods of testing software components require a separate test driver for each component. Each test driver is unique to the software component under test and is neither reusable nor applicable to other components to be tested. Each software developer has a different method or style of testing software and thus the test drivers are usually not transferable to other developers or even other software components. Regression testing or comparing actual results with expected results must be conducted manually by observing the actual results, or the test driver has to be modified to perform the comparison.

For a test of software, an operator may interact with a GUI-equipped client platform referred to as a Human Computer Interface (HCI) as one component in a control system. One or more data servers may communicate with the HCI to simulate an associated device in the control system. The data servers may interact with one or more server threads in the HCI. The operator may interact through an interface thread that displays a GUI window for each instantiated executable program. The server and interface threads may exchange information between each other, with each window responding to condition changes caused by the exchanges.

SUMMARY

Conventional software testing yields disadvantages addressed by various exemplary embodiments of the present invention. In particular, capabilities are needed to comprehensively test all option selections. Other various embodiments alternatively or additionally provide for obviating the necessity for providing simulators prior to software development and testing.

Various exemplary embodiments provide a method and a system for driving a computer interface for a user. The system includes a computer platform, a test driver having software on the computer platform, a window providing an interface between the computer platform and the user, and a command file that provides instructions to the computer interface for execution by the driver software, as well as verification of the production software. The instructions mimic user and external subsystem input. The method includes providing instructions and verification via a command file, providing driver software to the computer interface, and executing the instruction on the computer interface using the driver software. The instructions mimic user and external subsystem input.

In various exemplary embodiments, the system includes a remote server in which the method provides for exchanging information with the client and executing a server command from the server in response to the information. In alternate embodiments, a window is provided to display the instruction, and thereby enable the instruction to be edited and re-executed.

In other exemplary embodiments, the instruction in the command file verifies attributes of the information by one of confirming conformity and identifying discrepancy. Additional embodiments enable the user input to be selected from a list of menu options. The instructions may be incorporated using human-readable symbology, such as alpha-numeric characters. In addition, the driver software may incorporate a software library. The computer interface represents a Human Computer Interface (HCI). Preferably, an HCI Test Driver associated with the client platform represents a simulator for testing and verifying combat operations capabilities.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 3 is a block diagram view of an HCI Test Driver in conjunction with an HCI Window and an HCI Application;

FIG. 4 is a representational view of a TestWindow Header File Window;

FIGS. 5A and 5B are upper and lower representational views of a TestWindow Code File Window;

FIG. 8 is a representational view of a makefile Window;

FIG. 9 is a representational view of a SpecialAction Code File Window;

FIG. 10 is a representational view of a Test Command File Window;

FIG. 16 is a representational view of a TestWindow Code Window;

FIGS. 23A-23E are representational views of Generate Commands Window;

FIG. 27 is a representational view of Build Command Window;

FIG. 29 is a list table of Check Commands;

FIG. 30 is a list table of Control Commands;

FIG. 31 is a list table of File Commands;

FIG. 32 is a list table of Set Commands;

FIG. 33 is a list table of Widget Commands;

FIG. 34A-34D are list tables of Check Command Formats;

FIG. 35 is a list table of Control Command Formats;

FIG. 36 is a list table of File Command Formats;

FIG. 37 is a list table of Message Command Formats;

FIG. 38 is a list table of Set Command Formats;

FIG. 39 is a list table of Widget Command Formats; and

FIGS. 40A-40C are list tables of Parameter command Formats.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The Advanced Tomahawk Weapons Control System (ATWCS) represents an example combat weapons platform. ATWCS GUI software was based on the Motif widget set using the Ada programming language. ATWCS software was designed using an Object Oriented paradigm. A window within the software was considered an object. Unit testing each routine within the window package lacks the same effectiveness as testing the window package as a whole object. The HCI Test Driver concept was conceived based on the need to thoroughly test the window as an object.

The next software version for Tactical Tomahawk Weapons Control System (TTWCS) used C++ as the language for GUI development. HCI Test Driver, as provided in exemplary embodiments, enabled conversion from Ada to C++ with that capability subsequently extended to run on multiple platforms (HP-UX, Linux).

Original methods of testing these GUI windows required separate test drivers for each window. Each test driver was unique to the window under test and was neither reusable nor applicable to other windows to be tested. Each software developer had a different method or style of testing software and thus the test drivers were usually not transferable to other developers or even other software components. Regression testing, or comparing actual results with expected results, had to be done manually by observing the actual results, or the test driver had to be modified to perform the comparison. Continuing to write individual test drivers for each window in subsequent projects would have been costly, time consuming and tedious.

An example commercial tool for software testing and development is X-window GUI testing product, XRunner from Mercury™ Interactive Corporation. See http://www.mercury.com/us/products/application-delivery/xrunner/. This tool enables user interaction, such as button clicks and data entry to be recorded. However, the software development industry requires more extensive capabilities, as provided by various exemplary embodiments described herein.

Figure 1:
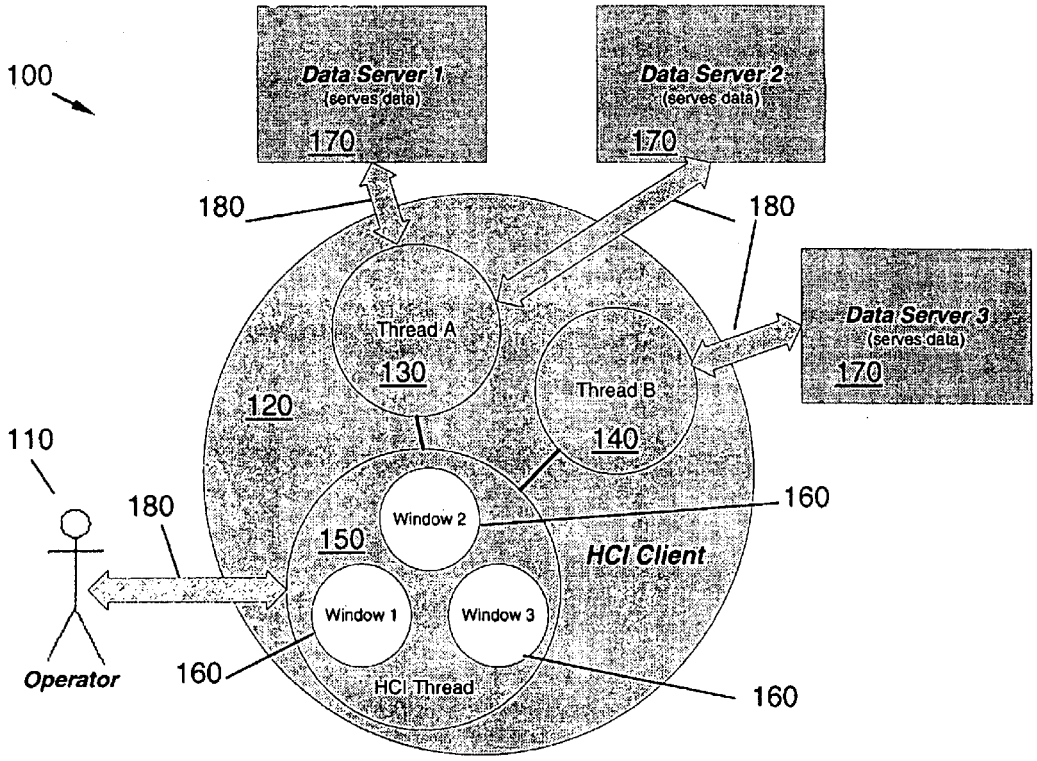
FIG. 1 (Related Art)
FIG. 1 is a block diagram view of a conventional HCI testing arrangement.

FIG. 1 shows a conventional software test system 100 as a block diagram. An operator 110 interacts with an HCI client 120 having server threads 130 and 140, as well as an HCI thread 150. The HCI client 120 represents an HCI process that executes on a computer platform. The operator 110 reviews the GUI information content in HCI windows 160 associated with the HCI thread 150. Data servers 170 communicate via the server threads 130, 140 to provide condition data to which the HCI thread 150 reacts. This reaction may prompt the operator 110 to provide a selection response. Communication between the operator 110 and the servers 170 may be accomplished via the HCI client 120, shown by interaction connectors 180. In a typical test environment, the servers 170 are replaced with production-quality simulators. The operator 110 may interact with the computer platform by moving on a display a cursor to an icon that represents a window portion and depressing an entry button on a user-signaling peripheral, such as mouse or keyboard. This operation is termed "clicking", for purposes of this application.

The design of the HCI Test Driver (coupled with the HCI design for ATWCS/TTWCS) has been widely used within the Tomahawk cruise missile program. This has enhanced the productivity of Navy GUI developers and significantly improved the quality of the GUI software. The flexibility and extensibility of the design enables conversion to a different Widget set of wxWidgets. This will facilitate development on more platforms than conventionally available (HP-UX, Linux, Microsoft) with the same productivity and high quality.

Figure 2:
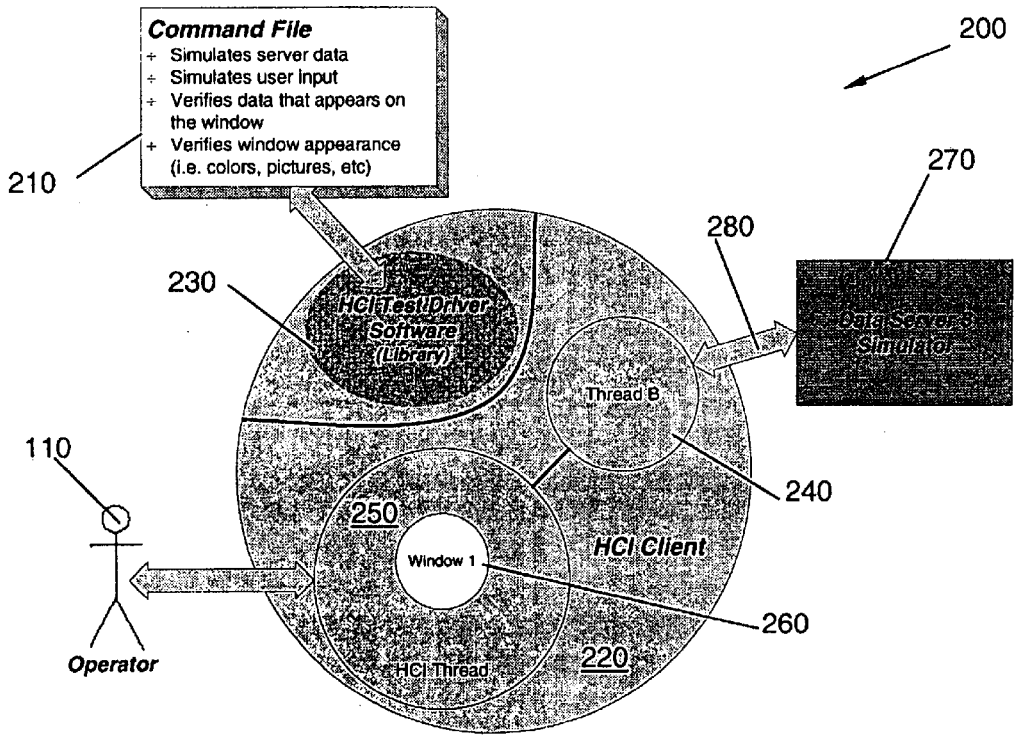
FIG. 2 is a block diagram view of an HCI testing arrangement in accordance with an exemplary embodiment.

General Architecture: By contrast with the conventional arrangement, FIG. 2 illustrates an exemplary software test system 200 as a block diagram. A text command file 210 provides a list of instructions to emulate server data, user inputs, window validation and response confirmation. The operator 110 interacts with an HCI client 220 having an HCI Test Driver software library 230 that interprets the command file 210. The HCI client 220 may have a server thread 240, as well as an internal thread 250, that are not replaced by the HCI Test Driver 230.

The operator 110 reviews the GUI information content in an HCI window 260 associated with the internal thread 250. Instructions in the command file 210 may be written in American Standard Code for Information Interchange (ASCII). The HCI windows 260 may be composed of widgets, such as push buttons, toggle buttons, pull-down menus, labels and images.

A data server 270 can either be the actual production data server or else a simulator independent of the command file 210. The server 270 communicates via the server thread 240 to provide condition data to which the internal thread 250 reacts. Communication between the operator 110 and the server 270 with the HCI client 220 is shown by interaction connectors 280.

FIG. 3 shows a block diagram 300 that describes this arrangement with a computer platform 310 having HCI software 320 and the HCI Test Driver 230. The software 320 includes the HCI Window 260 and an HCI Application 330. Artisans of ordinary skill will recognize that operating the HCI Test Driver 230, the HCI Window 260 and the HCI Application 330 may be preferably performed on a single computer platform 310, or alternatively be distributed among a plurality of platforms. This example illustrates that the computer 310 can operate the HCI Test Driver 230, the HCI Window 260 and the HCI Application 330 on the same machine and communicate by interfaces. The HCI Test Driver 230 can simulate multiple servers and their interfaces, in addition to actions (i.e., selections) that would otherwise be made by the operator 110.

The operator 110 can communicate with the HCI Window 260 by a first link 340 to issue a command receive an updated view of that window by the GUI imagery. The HCI Test Driver 230 can communicate by a second link 350 with the HCI Window 260 and by a third link 360 with the HCI Application 330 to send instruction messages and receive return messages.

The HCI Window 260 can communicate by a fourth link 370 with the HCI Application 330 to provide the GUI-update. For example, the HCI Window 260 may submit a user request to the HCI Application 330. This procedure can then update the window by changing the characteristic by an update view command.

For example, the command file 210 may direct the HCI Test Driver 230 to send a GUI-update message to the HCI Application 330 to update the characteristic of a button described later. The HCI Test Driver 230 issues a request for window attributes and/or attributes of user inputs. Upon receipt of the attributes, the HCI Test Driver 230 compares these against expected parameters for confirmation that the attributes changed appropriately.

Every HCI window 260 can be tested extensively with the HCI Test Driver 230 before being integrated with the tactical interfaces and software systems. In this manner, every aspect of the window 260 can be exercised to discover (and subsequently repair) all the software bugs and to make sure the software behaves correctly. The HCI Test Driver 230 can simulate multiple application servers and their interfaces to the HCI client 220. The HCI Test Driver 230 may send and receive the same messages that application servers send and receive. The HCI Test Driver 230 can also simulate key-punch input from the operator 110 such as pressing buttons and moving a mouse or other cursor manipulator. The HCI Test Driver 230 may also check the HCI Window 260 to determine if attributes have changed as expected.

Example Windows: An exemplary window and associated commands is described and explained in the following paragraphs. This simple window is named Test Window (see 600 in FIGS. 6A-6C) and may be created with a Push Button (see 610). An icon represents the Push Button that includes a label "Hello!!" for example. The Push Button is named helloPB in this example. In response to the operator 110 clicking the icon representing the Push Button, its label changes to "Goodbye" for example. Then, in response to the operator 110 clicking the icon again, the label changes back to "Hello!!", and so forth.

The particular X/Motif code and header files written to generate the Test Window 600 are respectively in TestMW.cc and TestMW.hh and written in C++. In this example, the header file in a Header Window 400 is located in TestWindowCb.hh, shown in FIG. 4. The application code is located in Code Window 500 is located in TestWindowCb.cc, with upper and lower portions 510, 520 shown respectively in FIGS. 5A and 5B.

The Header Window 400 contains procedures in lines of instructions 410 to chose 420, create 430, open 440 and close 450 the Test Window 600. In addition, the header file 400 handles the clicking of the "Hello!!" Push Button by a call-back procedure 460. The HCI client 220 represents the GUI software that the operator 110 for the computer platform 310 views on the monitor screen and through which applications can be interacted with or sequenced by the HCI Test Driver 230.

The code file 500 handles the display and processing of the Test Window 600. The code file 500 includes procedures to create 530 (FIG. 5A), open 540 (FIG. 5B), and close 550 (FIG. 5A) the Test Window 600. Also, the code file 500 has a procedure named helloCallback 560 (FIG. 5B) that handles (i.e., emulates) the operator's clicking of the "Hello!!" Push Button, called helloPB 570, on the Test Window 600. This handling procedure 560 contains the instructions that change the Push Button's label to "Goodbye" and "Hello!!" and so forth. A dashed oval 580 denotes a discrepant portion of code for the procedure 560, to be described later, provides an example of code verification.

Figures 6A, 6B, 6C:
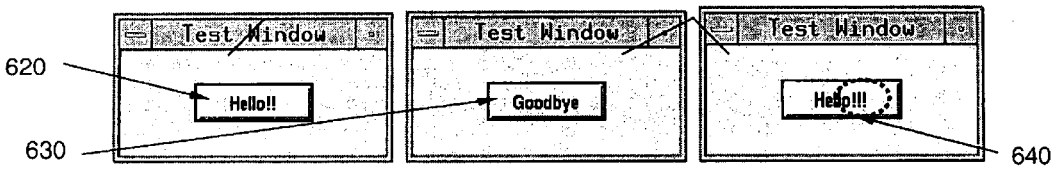
FIGS. 6A, 6B and 6C are representational views of a Push Button Test Window.

Exemplary embodiments of the Test Window 600, as described in further detail, are shown in FIGS. 6A, 6B and 6C, each featuring a Push Button 610. FIG. 6A shows the Push Button 610 as including a first label with "Hello!!" 620 as text. FIG. 6B shows the Push Button 610 as including a second label with "Goodbye" 630 as text. FIG. 6C shows the Push Button 610 as including a third label with "Hello!!!" 640 as text. The first and third labels of the Push Button 610 differ in the number of exclamation points therein, representing an instruction discrepancy denoted by an envelope (dashed oval) 650 in the third label, corresponding to the discrepant code 580.

Figure 7:
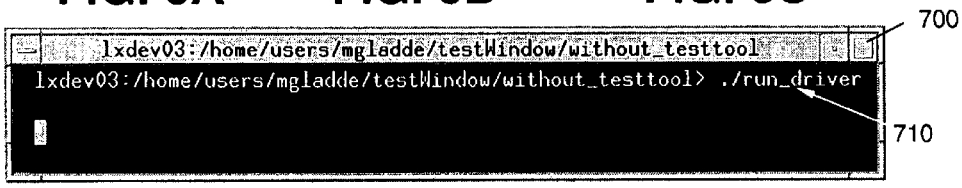
FIG. 7 is a first representational of an executable script.
Figure 14:
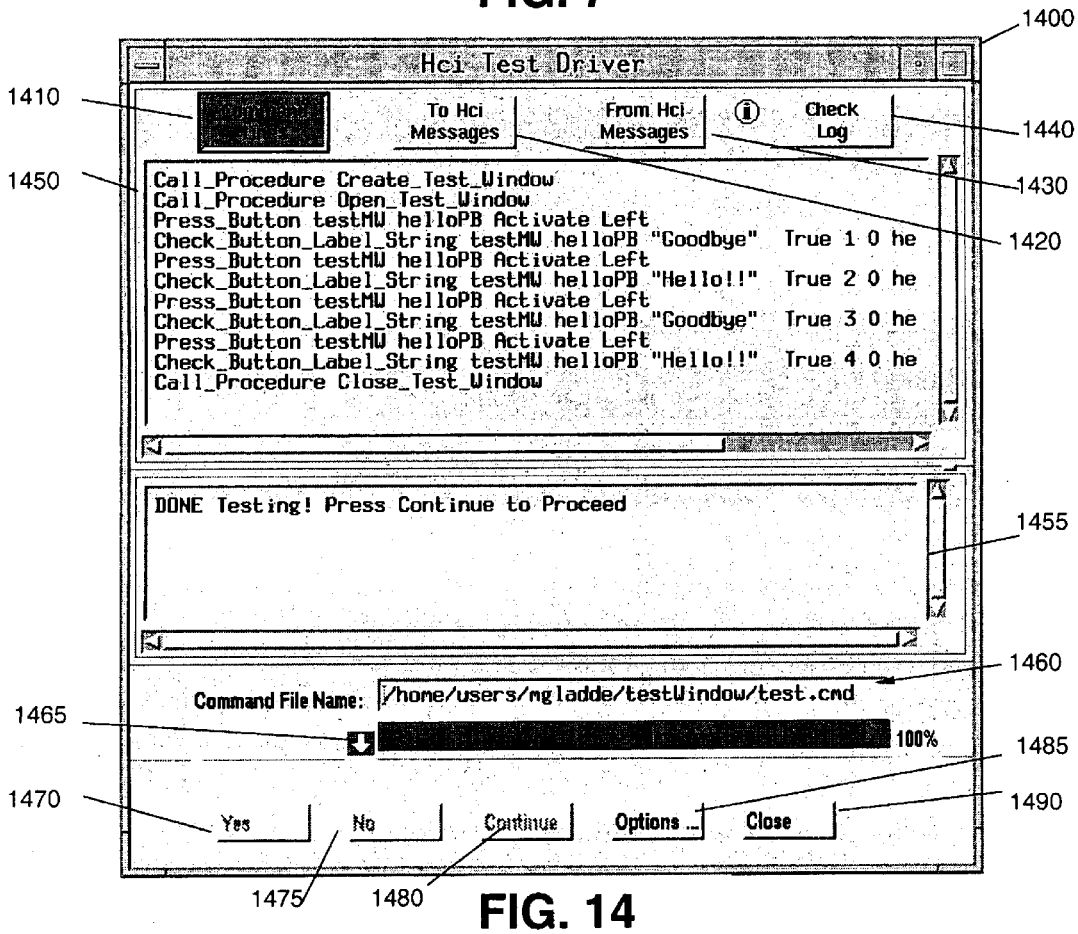
FIG. 14 is a first representational view of an HCI Test Driver Window.

Testing the Window without the HCI Test Driver: In a first operational embodiment, the operator 110 exercises the Test Window 600 without the HCI Test Driver 230. A makefile may be written to compile and bind the Test Window's files to produce an executable file, in this case named testMain. A short script named run_driver in a command line 710 may be created to run the testMain executable 700 labeled 1xdev03, as shown in FIG. 7. The executable 700 incorporates a command line to receive and process an instruction from the operator 110. The software for an HCI Application 330 represents the code behind the HCI window 260 that handles the operator's actions. The operator 110 may make a selection by pressing (or clicking) the Push Button 610.

Typing run_driver in the command line 710 causes the Test Window 600 to open in FIG. 6A. Then in response to the operator 110 clicking on the Push Button 610 labeled "Hello!!" 620 in FIG. 6A changes the label to "Goodbye" 630 in FIG. 6B. The operator 110 visually verifies that this was performed correctly. Next, in response to the operator 110 clicking on the Push Button 610 labeled "Goodbye" 630 in FIG. 6B changes the label back to "Hello!!" 620 in FIG. 6A. The operator 110 visually checks that this was done correctly. However, in this example, the label instead changes to "Hello!!!" 640 in FIG. 6C.

Notice that there is an extra exclamation point shown in the dashed oval 650. This is due to a bug (i.e., coding flaw) in the helloCallback code 540. Examination of the code in the TestWindowCb.cc file 500 may reveal the bug. On the other hand, the operator 110 that visually verifies the correct working of the Test Window 600 may easily overlook this subtle defect. In contrast, the operator 110 testing this Test Window 600 with the HCI Test Driver 230 receives explicit notice of this bug that causes the display flaw in FIG. 6C, as is explained later.

If the operator 110 clicks the Push Button 610 again, the label will change back to "Goodbye" 630 in FIG. 6B, and then back to "Hello!!!" 640 in FIG. 6C. Once again, the Push Button's label reveals the flaw in the envelope 650 that the operator 110 may have visually neglected, and the rather obscure software bug may continue unnoticed.

Testing the Window with the HCI Test Driver: To use the HCI Test Driver 230 for testing the Test Window 600, a makefile 800 in FIG. 8 is written that includes test tool libraries at arrow 810: -Itesttool, -ItesttoolBase and -testtoolXrt being added to the makefile 800. The same previously described Test Window files (TestMW.cc, TestMW.hh, TestWindowCb.cc, and TestWindowCb.hh) mentioned above may be used.

The test tool libraries 810 are added to the makefile 800. The HCI Test Driver 230 provides a custom file named SpecialAction.cc 900, shown in FIG. 9, that provides commonly used functions to be used in the command file 210. The SpecialAction.cc 900 includes operations for creating 910, opening 920 and closing 930 the command file 210. The operator 110 merely inserts in the window's class name (TestWindowCb). After accomplishing this, the operator 110 will be able to create, open, and close the Test Window 600 from the command file 210, as described subsequently.

The command file 210, named test.cmd as a Test Command Window 1000, is written as shown in FIG. 10 to create and open the Test Window 600. Then, test.cmd 1000 runs the same test performed as described above while verifying that the correct label "Hello!!" 620 or "Goodbye" 630 of the Push Button 610 is displayed each time the Push Button 610 is clicked. To finish, the command file 210, as test.cmd 1000, closes the Test Window 600 and pauses for the operator 110 to observe completion of the testing.

Figure 11:
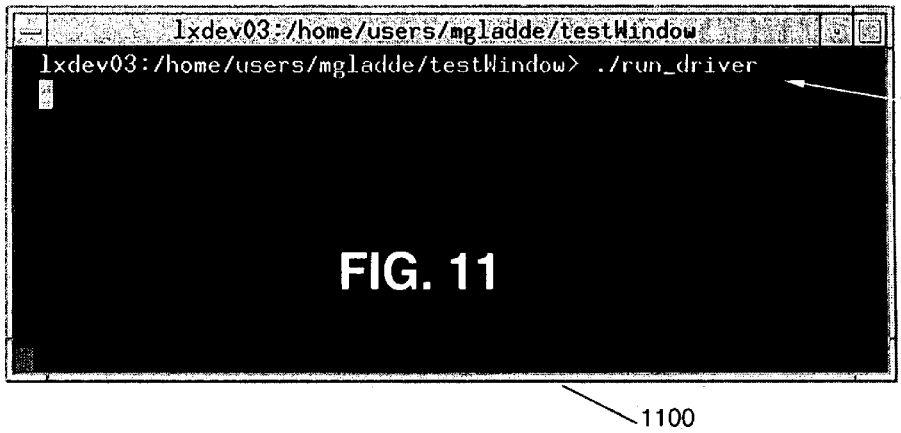
FIG. 11 is a second representational view of the executable script.

The makefile 800 is used to compile and bind the files, thereby producing an executable named testMain. The same script 1100 for run_driver in FIG. 11 (as in the previous testMain script 700) may then be used to run testMain. The HCI Test Driver's main routine, named testMain.cc, may be used instead of the application's main routine to create the HCI Test Driver's windows (Command File Window in FIGS. 12A and 12B and HCI Test Driver Window in FIGS. 14, 15, 18 and 19) and open the Command File Window 1200 to read in the command file 210.

Figures 12A, 12B:
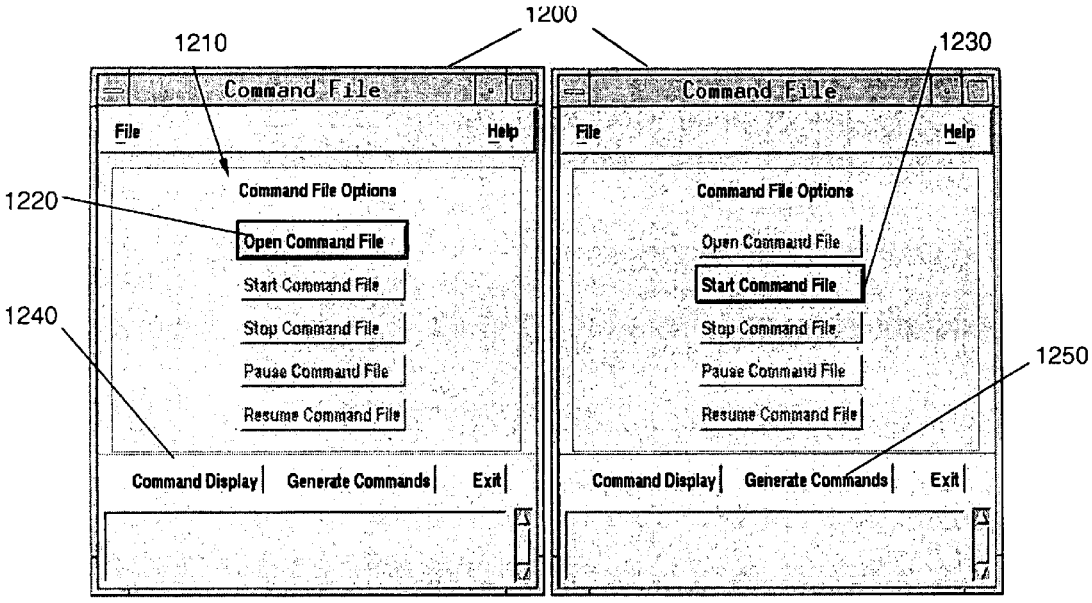
FIGS. 12A and 12B are representational views of a Command File Window.

Upon opening the Command File Window 1200 in FIG. 12A, a list of command file options 1210 is displayed. These include an "Open Command File" button 1220 highlighted in FIG. 12A and a "Start Command File" button 1230 highlighted in FIG. 12B. Additional buttons for "Command Display" 1240 and "Generate Commands" 1250 are provided.

Figure 13:
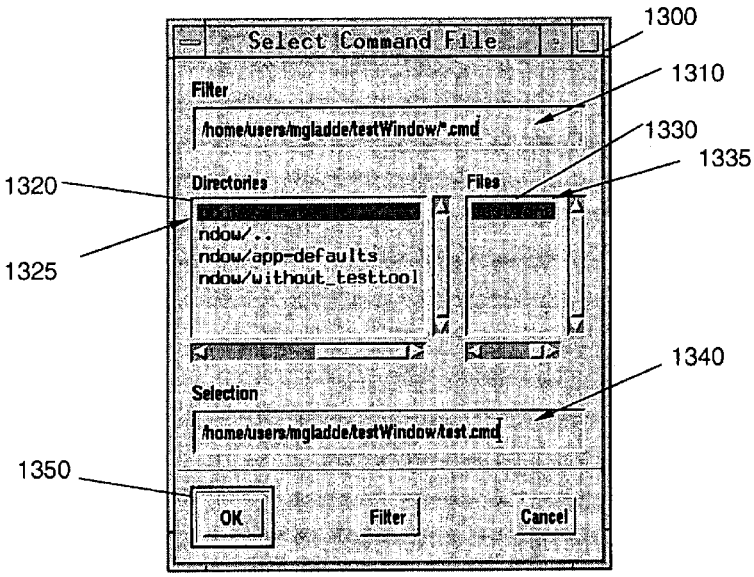
FIG. 13 is a representational view of a Select Command File Window.

The operator 110 may click the "Open Command File" button 1210 to choose the command file 210 desired and the HCI Test Driver 230 to use. This opens a Select Command File Window 1300, shown in FIG. 13, that includes a filter dialog box 1310 for listing command file name candidates among a directories list 1320 with a highlighted directory name "testWindow/." 1325 together with a file list 1330 having a highlighted file name "test.cmd" 1335. The chosen file may be displayed in a selection dialog box 1340. After verifying that the test.cmd command file name 1335 corresponds to the chosen file, the operator 110 may click the "OK" (i.e., okay) button 1350.

The operator 110 may then click the "Start Command File" button 1230 so the HCI Test Driver 230 can begin reading in and executing test.cmd 1000. The HCI Test Driver Window 1400 opens as FIG. 14. The HCI Test Driver Window 1400 includes a list of upper display buttons including "Command Lines" 1410, "To HCI Messages" 1420, "From HCI Messages" 1430 and "Check Log" 1440. In this example, the "Command Lines" button 1410 is highlighted. The "Check Log" tab 1440 displays test results and other summary information.

The contents from these display buttons may be displayed in a text box 1450, while a status box 1455 may provide instructional options. In this example, the HCI Test Driver Window 1400 enables the operator 110 to observe each line of test.cmd appear in the text box 1450 as that line is executed. The file name test.cmd for the command file 210 that was previously selected is identified in a Command File Name dialog box 1460. The HCI Test Driver 230 can be arranged to automatically start the command file 210 in response to a particular command file being specified on the command line 1460.

In this example, a "down" arrow icon 1465 (that may be colored red for emphasis) is shown below the dialog box 1460 and adjacent to a progress bar. The "down" arrow 1465 means that at least one of the tests failed, i.e., that there is a bug in the Test Window code. A prompt section below the arrow 1465 and the progress bar includes buttons for "Yes" 1470, "No" 1475, "Continue" 1480, "Options" 1485 and "Close" 1490.

Figure 15:
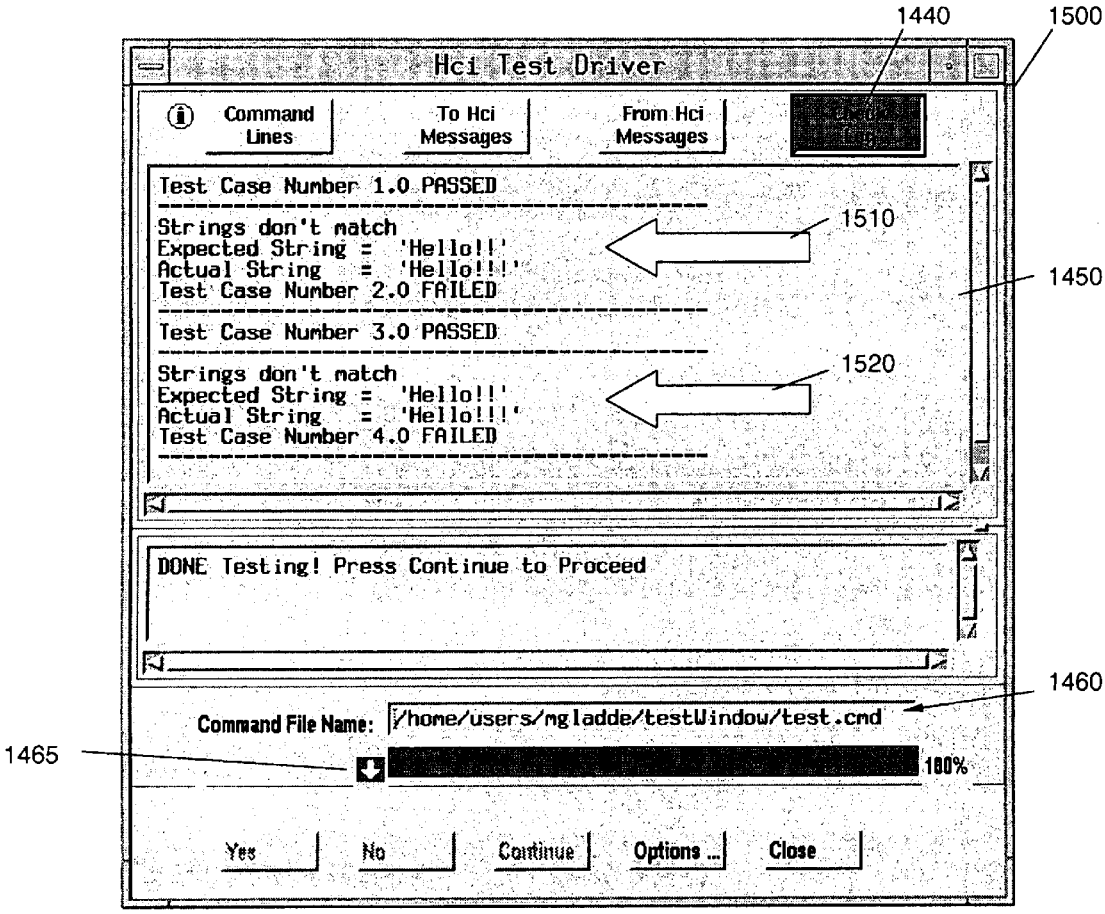
FIG. 15 is a second representational view of the HCI Test Driver Window.

The operator 110 may click on the "Check Log" button 1440 at the top of the HCI Test Driver Window 1400 to see which test(s) failed. The HCI Test Driver Window 1500 changes to highlight the "Check Log" button 1440 and adjusts the information displayed in the text box 1450, as shown in FIG. 15. In particular, the text box 1450 shows, by respective arrows 1510 and 1520, that the second and fourth test cases failed due to non-matching strings.

In this manner, the HCI Test Driver 230 informs the operator 110 which tests failed and why they failed. The Test Driver Window 1500 tells the operator 110 that the label for the Push Button 610 should display "Hello!!" 620 (with two exclamation points) while the label actually displayed "Hello!!!" 640 (with three exclamation points). This discrepancy corresponds to the code portion within the dashed oval 580 in the TestWindowCb.cc code file 500.

Now, the operator 110 can return to TestWindowCb.cc 1600 in FIG. 16 and find the bug. The portion of TestWindowCb.cc 1600 displayed in FIG. 16 is approximately midway between views 510 and 520. The operator 110 can immediately observe that the wrong number of exclamation points is in the code. The fix appears as shown in the helloCallback procedure 560 at the line pointed to by arrow 1610. The string "Hello!!" within dashed oval 1620 provides the correct instruction in the code.

Figure 17:
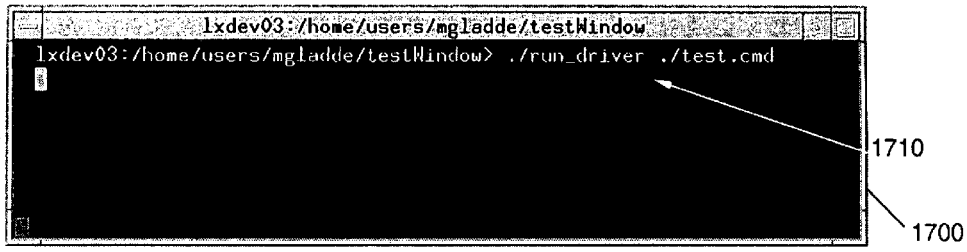
FIG. 17 is a third representational view of the executable script.

The operator 110 can readily test the Test Window 600 again with the HCI Test Driver 230 by running a script 1700 shown in FIG. 17 with run_driver and test.cmd as concatenated instructions 1710. The operator 110 can enter the command file 210 as test.cmd on the same command line with the script run_driver so the HCI Test Driver 230 will immediately begin execution).

Figure 18:
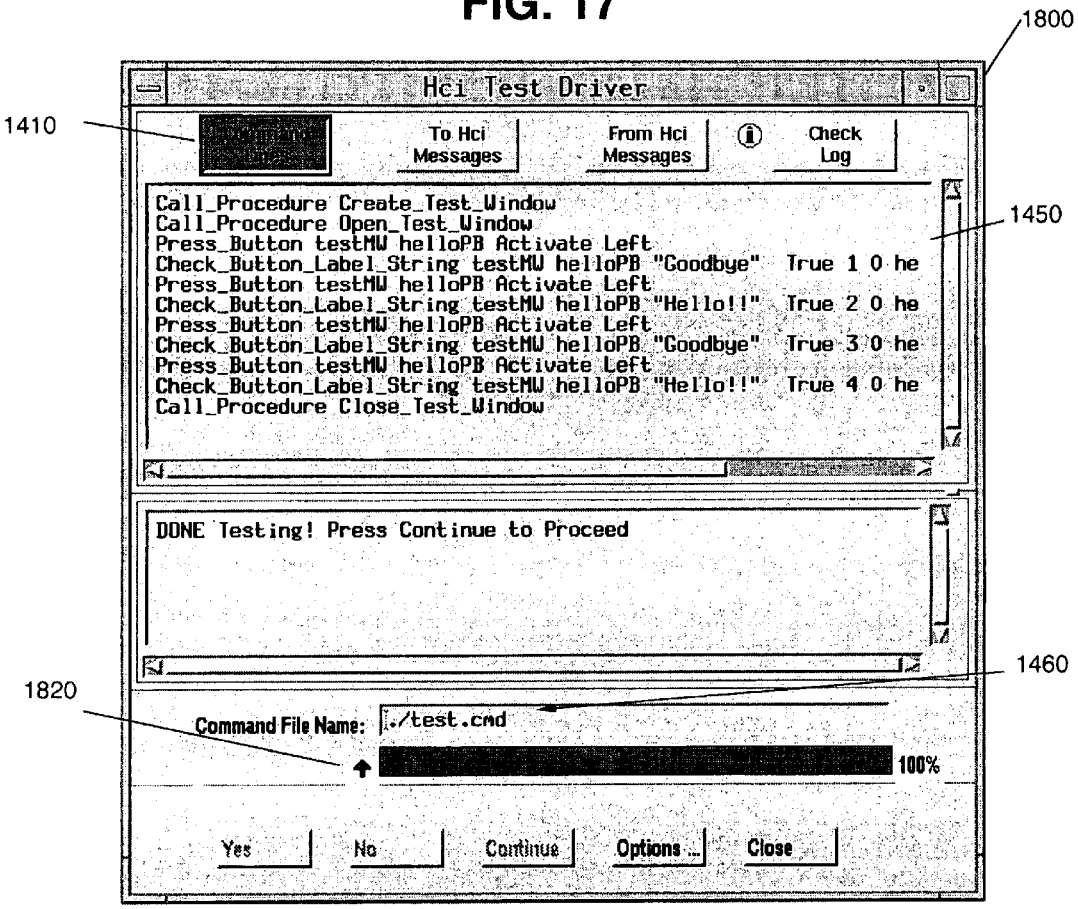
FIG. 18 is a third representational view of the HCI Test Driver Window.
Figure 19:
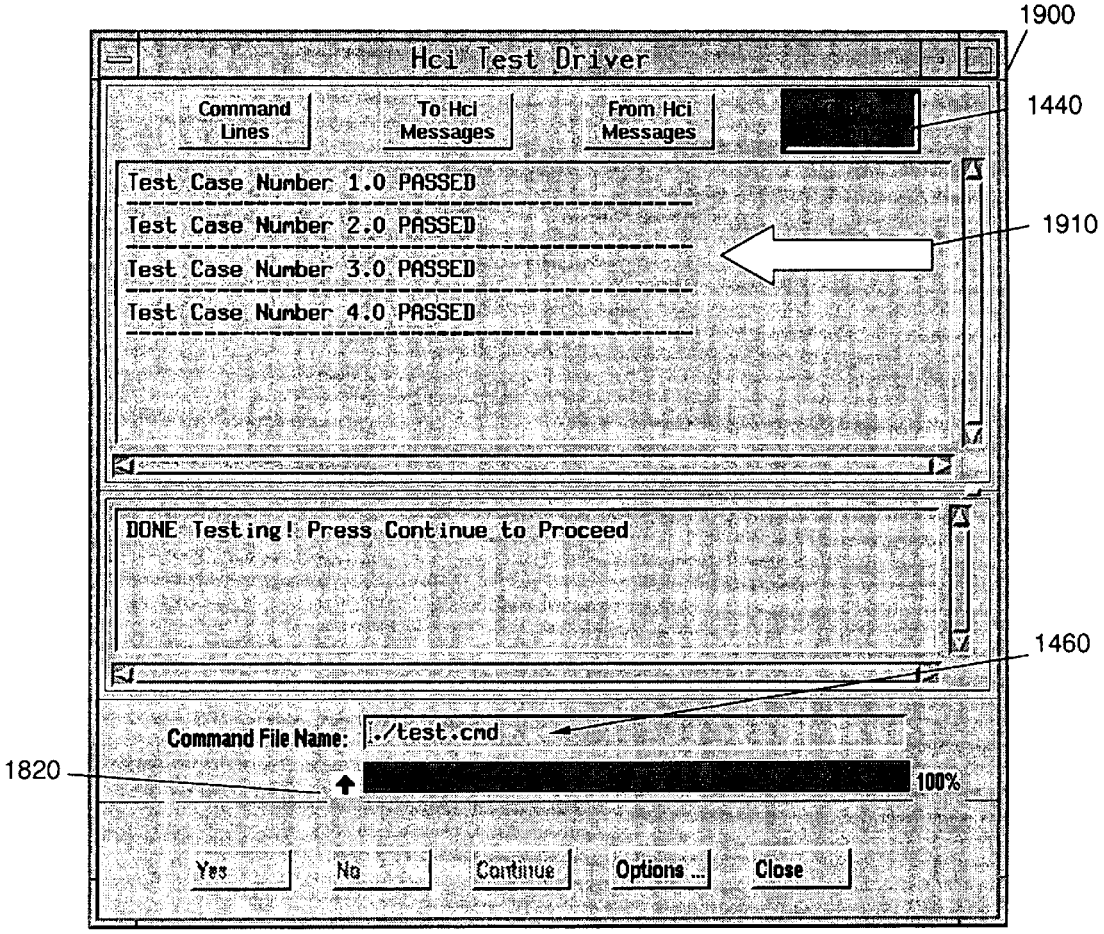
FIG. 19 is a fourth representational view of the HCI Test Driver Window.

In response, the HCI Test Driver Window 1800 opens as FIG. 18 and starts running the test.cmd command file. This time the HCI Test Driver 230 returns an "up" arrow 1820 (that may be colored green for emphasis) because all the tests passed. The operator 110 can also examine the text box 1450 to verify that all the tests passed. Selecting the "Check Log" 1440 button replaces the information displayed in the text box 1450 as shown in FIG. 19 in the HCI Test Driver Window 1900. The operator 110 can examine the information that summarizes the test results denoted by arrow 1910 in the text box 1450, verifying that all the tests passed.

Figure 20:
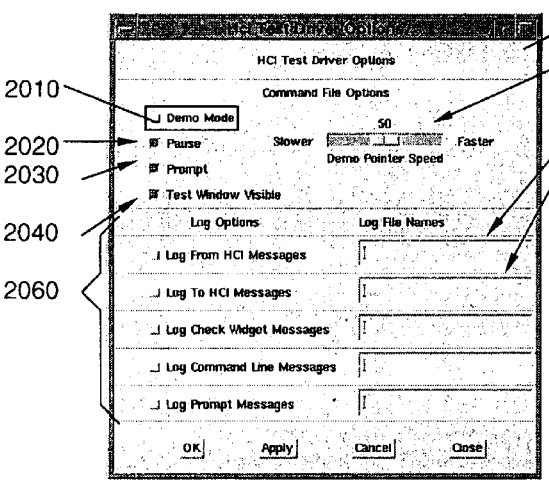
FIG. 20 is a representational view of HCI Test Driver Options.

Supplemental Features: When executing a command file 210, "Prompt" and "Pause" commands may be used to control the testing process with appropriately selectable buttons. When a "Prompt" command is encountered e.g., FIG. 22), the "Yes" and "No" buttons 1470, 1475 are sensitive, and the operator 110 responds either "Yes" or "No" to the prompt. For example, the operator 110 may be prompted to verify that actual results matched expected results. When a "Pause" command is encountered, the "Continue" button 1480 is sensitive. Selection of the "Options" button 1485 displays an HCI Test Driver Options Window 2000, as shown in FIG. 20, to the operator 110.

The HCI Test Driver Options Window 2000 includes several toggle buttons 2010, 2020, 2030, 2040 for setting test options. The "Demo Mode" toggle button 2010 is used to simulate mouse movement when widget activation commands are used in the command file 210. When such an instruction is used, the mouse moves to the referenced widget before activating that widget. To accelerate the test process, the "Pause" toggle button 2020 may turn off pauses in the command file 210. The "Prompt" toggle button 2030 may turn off prompt commands. When these buttons are toggled off, the commands are ignored. The "Test Window Visible" option 2040 is used to hide the Test Window 600.

A slider bar 2050 is used to slow down or speed up mouse movements when the "Demo Mode" button 2010 is selected. "Log" option toggle buttons 2060 are used to save the contents of the tabs 1410, 1420, 1430, 1440 on the HCI Test Driver Window 1400. The operator 110 may enter a file name in an appropriate dialog box line 2070 to enable toggling the associated one of the toggle buttons 2060.

Figure 21:
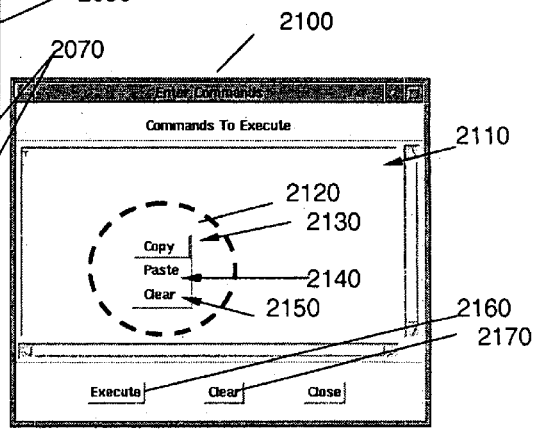
FIG. 21 is a representational view of Enter Commands Window.

An "Enter Commands" function (not shown) in the HCI Test Driver 230 displays an Enter Commands Window 2100 shown in FIG. 21. The Enter Commands Window 2100 enables commands to be entered manually in a text editing box 2110. The Enter Commands window 2100 also has an associated pop-up menu 2120, also shown in FIG. 21. The menu 2120 includes editing command selections, such as "Copy" 2130, "Paste" 2140 and "Clear" 2150 (erase text in box). Beneath the text editing box 2110 are window operation buttons, such as "Execute" 2160 (commands), "Clear" 2170 and "Close" 2180 (window).

Figure 22:
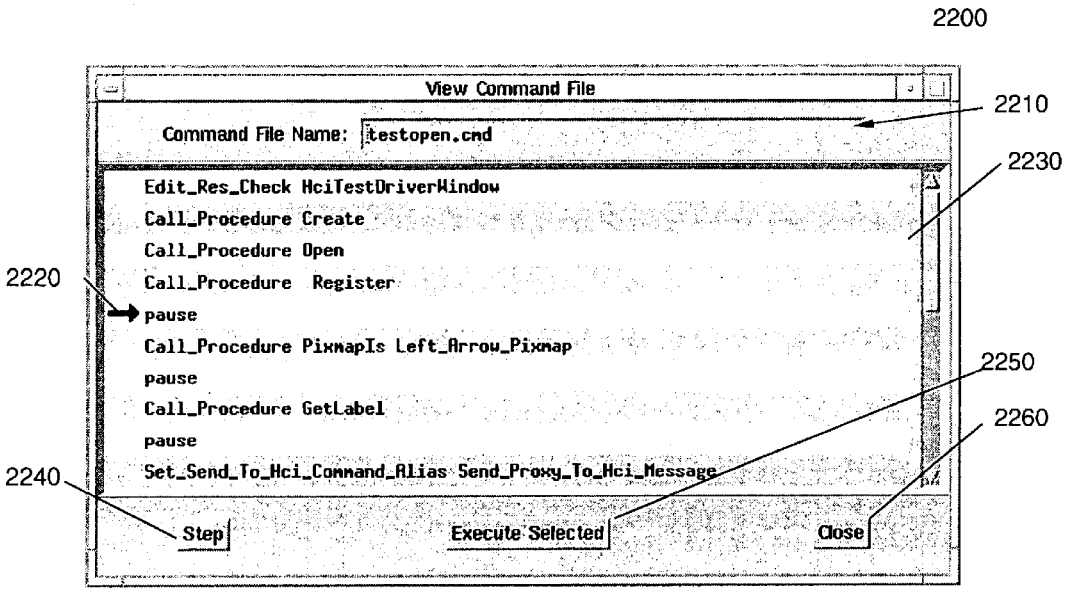
FIG. 22 is a representational view of View Commands File Window.

A "View Command File" function (not shown) in the HCI Test Driver 230 displays a View Command File Window 2200 shown in FIG. 22 containing the command filename 2210 with a pointer 2220 at a "Pause" command to the current command being executed in FIG. 22. The command lines are listed in a Commands pane 2230. This window 2200 also has options to "step" through the command file 210 and to execute selected commands by directing the pointer 2220. The commands in the Commands pane 2230 can be selected in non-contiguous order. The View Command File Window 2200 also includes window operation buttons, such as "Stop" 2240, "Execute Selected" 2250 (command) and "Close" 2260 (window). In addition to the button 2250, a double-click action on a command line will result in that command being executed.

Figure 23A:
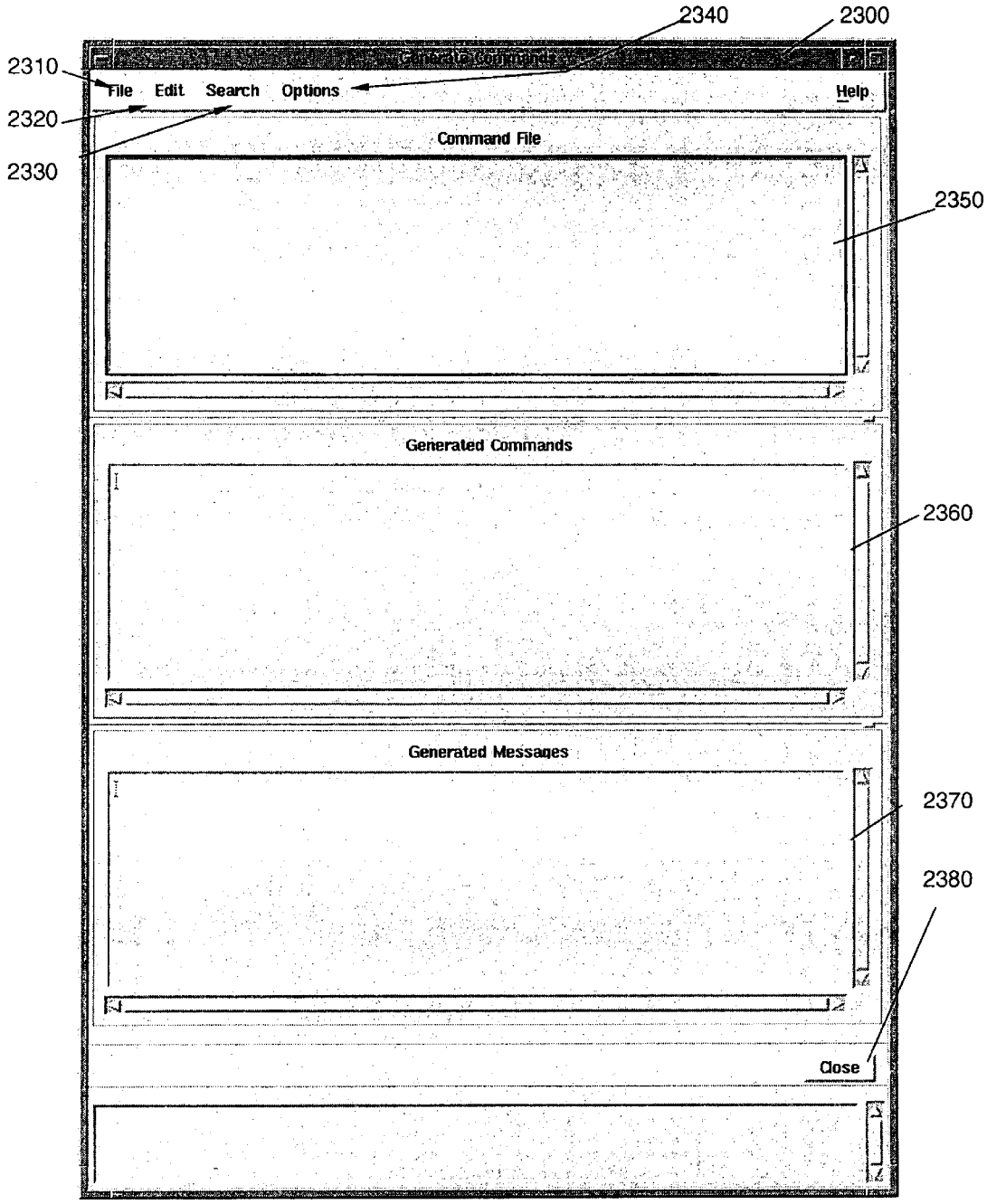

A Generate Commands Window 2300 in FIG. 23A provides a mechanism for automatically generating commands that can be inserted in a command file 210 for testing window components. The Generate Commands option 1230 (in FIG. 12B) displays the Generate Commands Window 2300 to assist in the creation of command files used for testing. This window 2300 allows the operator 110 to specify Source, User Interface Language (UIL) and/or App-Defaults files associated with the window being tested. The window 2300 includes four pull-down menu tab for generating commands. These include a File tab 2310, an Edit tab 2320, a Search tab 2330 and an Options tab 2340. The menu details are shown in FIGS. 23B-23E.

The Generate Commands Window 2300 has three panes shown in FIG. 23A used to build command files 210: the Command File pane 2350, the Generated Commands pane 2360, and the Generated Messages pane 2370. The Command File pane 2350 contains the command file specified when the HCI Test Driver 230 starts or one that was opened from the File pull-down menu 2310 in FIG. 23B. The Generated Commands pane 2360 contains instructions generated from information extracted from the UIL and App-Defaults files.

The command filenames can be provided in the Command File pane 2350. The Generates Commands Window 2300 extracts information from these files and inserts in the instructions produced therefrom in the Generated Commands pane 2360. Messages processed by the window 2200 may be extracted from the source code of the command file 210 in the Generated Messages pane 2370. This window 2300 also includes a "Close" button 2380 for the window's termination.

Figure 23B:
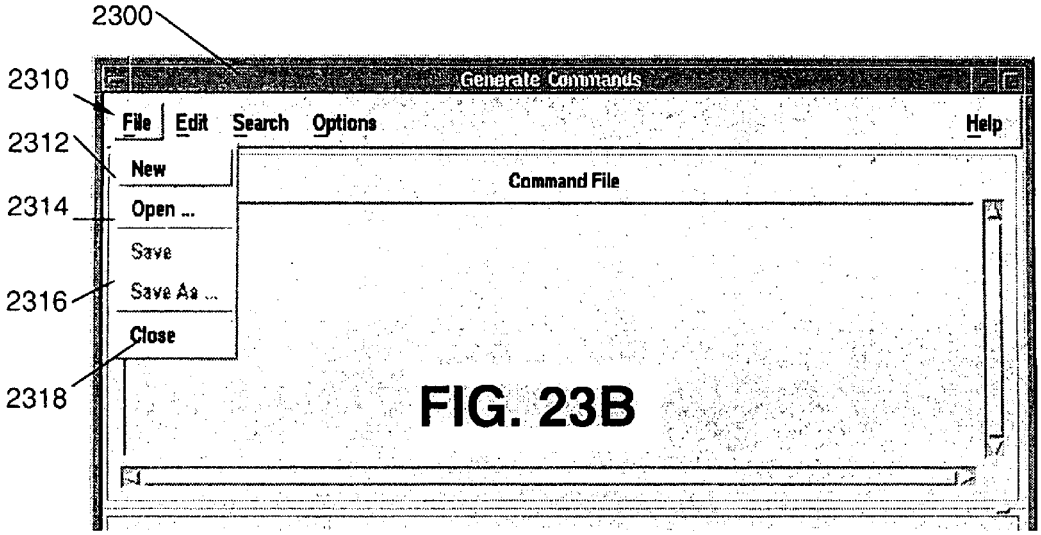
Figure 23C:
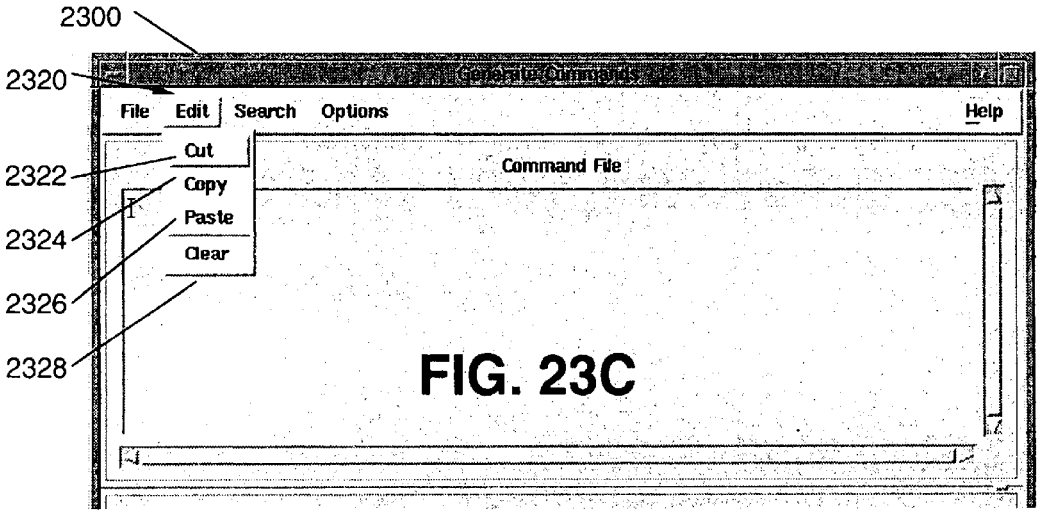

FIG. 23B illustrates details of the File tab 2310 in the Generate Commands Window 2300 for a command file 210 being edited. Menu selections include, inter alia, "New" 2312, "Open" 1314 (pre-existing), "Save As" 2316 (for opened file) and "Close" 2318. FIG. 23C illustrates details of the Edit tab 2320 in the Generate Commands Window 2300 for text of instructions in the command file 210 being edited. Menu selections include "Cut" 2322, "Copy" 2324, "Paste" 2326 and "Clear" 2328 in relation to instructions in the Generated Messages pane 2370.

Figure 23D:
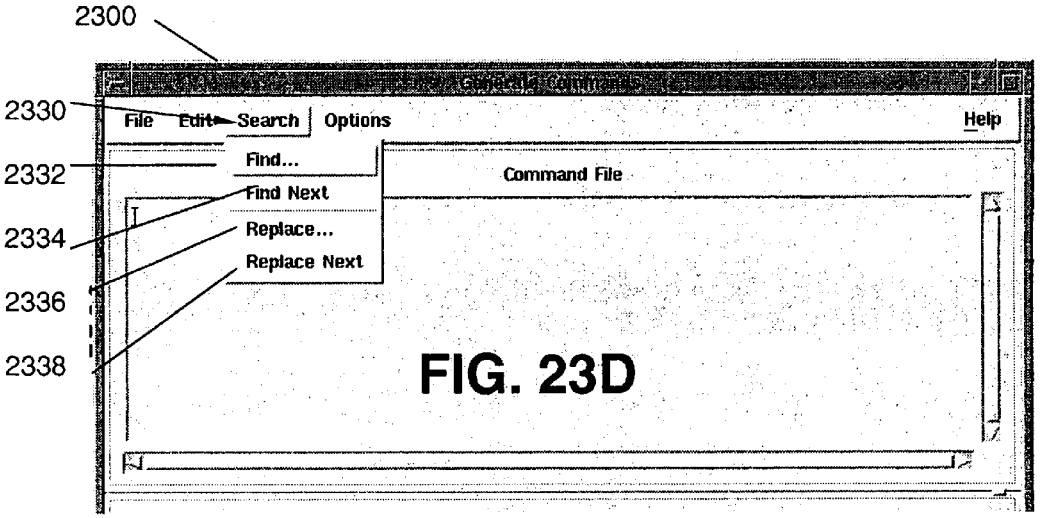

FIG. 23D illustrates details of the Search tab 2330 in the Generate Commands Window 2300 for identifying specific text. Menu selections include "Find" 2332, "Find Next" 2334, "Replace" 2336 and "Replace Next" 2338. FIG. 23E illustrates details of the Options tab 2340 in the Generate Commands Window 2300 for particular file types under Preferences 2341. Menu selections include groups, such as: File Selection 2342, Category Selection 2344, Generation 2346 and Display 2348.

The File Selection group 2342 includes: "Select UIL File" 2342*a*, "Select AppDefaults File" 2342*b*, "Select Source File" 1242*c* and "Select By Widget" 2342*d*. The Category Selection group 2344 includes: "Select By Command" 2344*a*, "Select By Template" 2344*b* and "Select By Message" 2344*c*. Additional selections 2349 include generation and display options for the Generated Commands pane 2360 and the Generated Messages pane 2370. The Generation group 2346 includes options, inter alia, "Generate Commands" 2346*a*, "Refresh Comments" 2346*b*, "Execute Selected Commands" 2346*c* and "Generate Messages" 2346*d*. The Display group 2348 includes options for providing or erasing commands and/or messages.

Widget names and classes are extracted from the UIL file and context sensitive help information is extracted from the App-Defaults file. Once the files are specified, instructions can be generated and inserted into a command file 210. The File, Edit, and Search pull-down menus 2310, 2320, 2330, 2340 apply to the pane that currently has focus (i.e., not "grayed-out" and hence inactive). For example, if "Save As" 2316 in FIG. 23B is selected and the Generated Commands pane 2360 has focus, then the information therein would be saved in the specified file (having a given filename). The Options pull-down menu 2340 in FIG. 23E contains several options that are available depending on which files or options have been selected.

For example, when a UIL file has been specified via "Select by UIL" 2342*a* in FIG. 23E, the Generate Commands button 2346*a* becomes available. When this button 2346*a* is selected, commands are generated and inserted in the Generated Commands pane 2360 and the following options become available: "Select by Widget" 2344*a*, "Select by Commands" 2344*b*, "Refresh Commands" 2346*b* and "Execute Selected Commands" 2346*c*.

Figure 24:
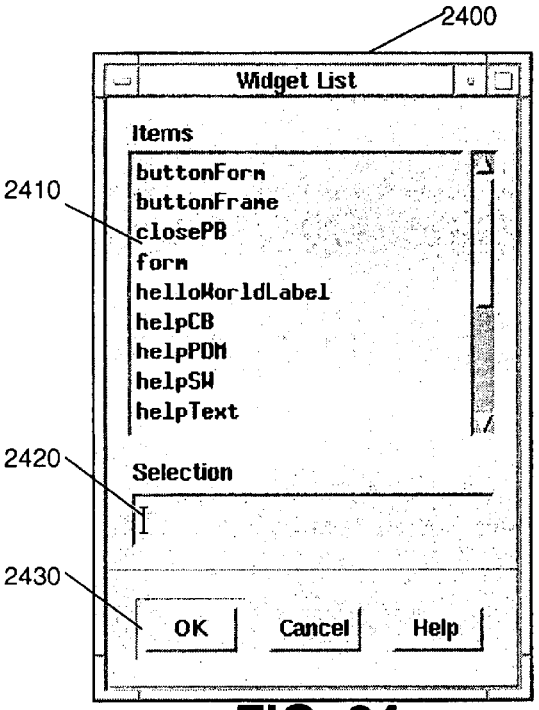
FIG. 24 is a representational view of a Widget List Window.

The "Select By" options 2342, 2344 display the selected commands in the Generated Commands pane 2360. Selection of the "Select By Widget" option 2344*a* displays a Widget List Window 2400, as shown in FIG. 24. The window 2400 includes an Item List in Items pane 2410, a selection box 2420 (to identify the highlighted item) and a selection of buttons, including an "OK" button 2430. When a widget from the Items pane 2410 and the "OK" button 2430 are selected, those commands specifically associated with the selected widget are then displayed.

Figure 25:
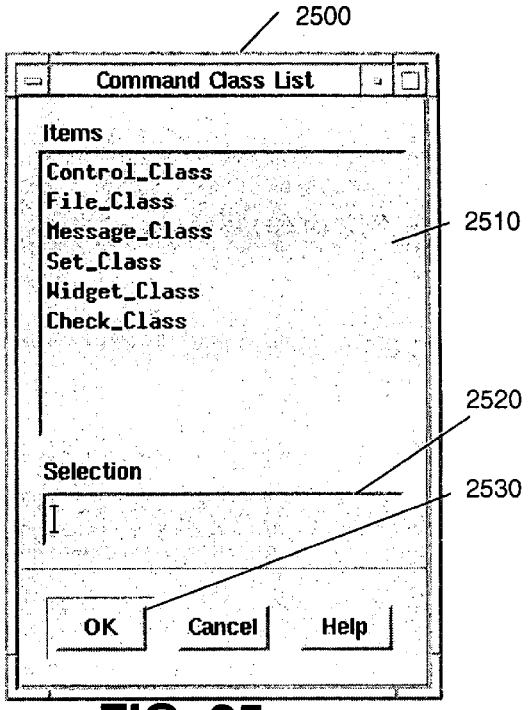
FIG. 25 is a first representational view of a Command Class List Window.
Figure 26:
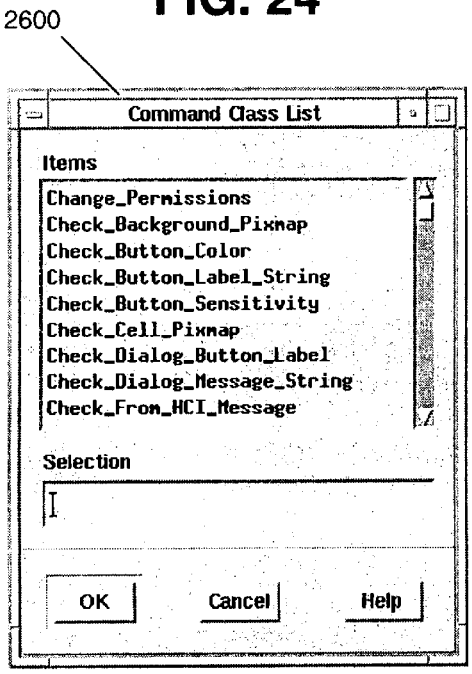
FIG. 26 is a second representational view of the Command Class List Window.

Likewise, selection of the "Select By Command" option 2344*b* displays a first Command Class List Window 2500, as shown in FIG. 25. The window 2500 includes a Command Class List in Items pane 2510, a selection box 2520 (to identify the highlighted class) and a selection of buttons, including an "OK" button 2530. When a command class from the Class pane 2510 and the "OK" button 2530 are selected, those commands specifically associated with the command class are displayed. Similarly, the "Select By Template" option 2344*c* displays a second Command Class List Window 2600, as shown in FIG. 26, so that a single command can be created, such as a verification check on a particular parameter.

A Build Command Window 2700 as shown in FIG. 27 displays a command and all of its parameters, enabling the operator 110 to edit the parameters and add the command to the command file 210. In this example, a Check_Button_Color command 2710 is displayed with a Parameter Selection pane 2720, a Parameter Value field 2730 and a series of buttons 2740, including an "Add To Cmd File" button 2742 and an "OK" button 2744.

Items listed under Parameter Name field column 2750 in the Parameter pane 1720 can be edited under Parameter Value field column 2760 accompanied by a Select column 2770. The Select column 2770 contains two types of arrows, a down arrow 2772 and a left arrow 2774.

Figure 28:
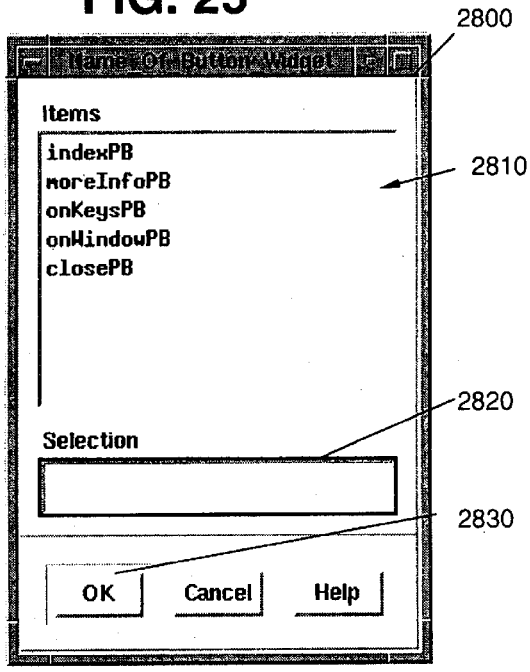
FIG. 28 is a representational view of Name of Button Widget Window.

The down arrow 2772 indicates that the parameter is a list of values displayed in a Parameter Selection Window 2800, as shown in FIG. 28, when that arrow 2772 is selected. An Items pane 2810 provides a list of Parameters from which to select, thereby including the item name in a Selection box 2820, beneath which are a series of buttons, including an "OK" button 2830. When a value from the Items pane 2810 and the "OK" button 2830 are selected, the value is automatically inserted in the Parameter Value field column 2760, and that value is updated. The left arrow 2774 indicates that the operator 110 enters a value to the left in the Parameter pane 2730 under the Parameter Value field column 2760. Once a command line has been created, that instruction can be added to the command file 210 by selecting the "Add To Cmd File" button 2742.

Exemplary Lists: There are several different types of commands supported by the HCI Test Driver 230. Check commands shown in FIG. 29 are used to check expected results versus actual results. Control commands shown in FIG. 30 control the flow of testing. File commands shown in FIG. 31 provide access to user files, log files and command files. Message commands for sending and receiving messages may be limited to a "Send_To_Hci_Message" command, although an additional "Set_Send_To_Hci_Command_Alias" command can be used to define send commands for each necessary interface. Set commands shown in FIG. 32 allow the operator 110 to set the behavior the HCI Test Driver 230, and Widget commands shown in FIG. 33 permit the operator 110 to activate widgets in the window under test.

FIG. 29 provides the list of Check Commands. When the commands are generated, in some cases, actual widget values are extracted and inserted into the command. For example, the Check_Label_String command under item "m.)" can be used to check the value of a label. When the commands are generated, the current value of the label is used when generating the command. If the label value changes and generating the command for the current value is desired, Refresh Commands button 2346*b* may be selected.

This may be useful when using Xrt Tables and verification of the sort order becomes necessary. The Check_Xrt_Sort_Order under item "kk.)" verifies a column in an Xrt Table to verify the values in each row. When generating this command, the current contents of the Xrt Table may be used in this command. In particular, a Check_Xrt_Sort_Order command may be generated for each column. If another sort button is selected, then the "Refresh Commands" button 2346*b* can be selected again, and new commands can be generated with the new sort order and added to a command file 210.

Command Formats for the HCI Test Driver Window 1400 include formats for files, controls, messages, sets and widgets. Check commands shown in FIGS. 34A, 34B, 34C and 34D provide examples regarding type of data entry and characteristics of the information content. Control commands shown in FIG. 35 provide operational procedures, such as for interruption initiation and flag settings. File commands shown in FIG. 36 provide formats for opening, saving and closing files. Message commands shown FIG. 37 provide for a message sent to the HCI client 220. Set commands shown in FIG. 38 address interface modes. Widget commands shown in FIG. 39 provide for characteristics of buttons and menu items. Parameter commands shown in FIGS. 40A, 40B and 40C describe parameters and their logical values.

The HCI Test Driver 230 reads command lines from a user-specified text file and executes those commands. The HCI Test Driver 230 strips all leading blanks from a command line, as well as empty command lines and any command line beginning with a sharp symbol "#" that is thereby interpreted as a comment. If the command line contains a "#" that is not enclosed in quotes, the "#" and remainder of the line is considered to be a comment. A command line may extend over several text lines. A "carriage return" indicates that the command line is continued on the next line. The command line consists of a directive and one or more parameters. Parameters are delimited by blanks. A string surrounded by double quotes is considered to be a single parameter. Parameters containing the "#" character must be enclosed in quotes.

Conclusion: This is an example of how to test a very simple window with the HCI Test Driver 230. The techniques provided herein can reduce workload and save enormous man-hour resources for larger and more intricate codes. As the developer fixes software bugs and adds functionality, the entire HCI Window 260 can be quickly tested (versus only testing the changes), and total branch coverage can be achieved. The HCI Test Driver 230 provides an environment for testing HCI Windows 260 independently without using server sockets for the receipt and transmission of messages. The HCI Test Driver 230 enhances GUI development and productivity significantly, thereby providing an invaluable tool for software integration and validation.

Advantages of using the HCI Test Driver 230 include: (a) providing a "quick start" for HCI development by reducing lead time of simulation components; (b) providing scalability, portability, and ease of use; (c) ensuring commonality of core classes, templates, tools, and libraries for development of any HCI Window 260; (d) containing a set of common classes used by most HCI Applications 330 to shorten development time; (e) containing a set of classes that can be customized for each application; (f) containing a set of classes to interface with the HCI Test Driver 230 for standalone testing of the application; (g) providing the structure for adding multiple client-server interfaces (such as pipes and sockets) from the HCI client 220 to application servers; and (h) providing abstract classes for applications to use to derive other classes in order to implement application-specific requirements.

In addition, the HCI Test Driver 230 (a) enables the HCI Window 260 to be tested without using sockets for the receipt and transmission of messages; (b) simulates sending messages to the HCI client 220 from multiple interfaces; (c) can fully test the HCI Window 260 before integration with other software systems; (d) runs using ASCII command files 210 that are easily modifiable for new test cases; and (e) can be run in automation mode to simulate the operator 110 pushing buttons and using the HCI Window 260.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for driving a computer interface on a computer platform that executes test software, the method comprising:

connecting the computer interface with an input provider via a thread;

communicating a command file having an instruction for execution on the computer interface;

providing driver software to the computer interface;

executing the instruction on the computer interface using the driver software to produce a result, wherein the instruction mimics a command from the input provider; and transmitting the result from the computer interface to the input provider.

2. The method according to claim 1, further comprising:

exchanging server information with a remote server, executing a server command from the remote server in response to the server information.

3. The method according to claim 1, further comprising:

displaying a window of the instruction on the computer interface; and providing an editor viewable by the window for modifying the instruction.

4. The method according to claim 1, wherein the instruction in the command file verifies attributes of the information by one of confirming conformity and identifying discrepancy.

5. The method according to claim 1, wherein the input provider is a series of selections from a list of menu options for a window displayable to an operator.

6. The method according to claim 1, wherein the command file includes a verification step that compares a reply to the instruction with an expectation to determine a discrepancy and displays an indicator in response to the discrepancy.

7. The method according to claim 1, wherein the command file incorporates the instruction in ASCII text using Motif code.

8. The method according to claim 1, wherein the driver software incorporates a software library.

9. The method according to claim 1, wherein the computer interface is a Human-Computer Interface (HCI), and the computer system is a platform simulator for combat operations.

10. A system for driving a computer interface for an input provider, the system comprising:

an interface client connecting by a thread to the input provider and having a computer platform that includes the computer interface;

a command file that issues an instruction to the computer interface;

a test driver having software on the computer platform and that executes the instruction for providing a result to the computer interface; and a window that displays on the interface client, the window communicating the result from the computer interface to the input provider, wherein the instruction mimics a command from the input provider.

11. The system according to claim 10, further comprising:

a remote server to exchange server information with the interface client, wherein the interface client executes a server command from the remote server in response to the server information.

12. The system according to claim 10, wherein the input provider is a series of selections from a list of menu options for the window displayable to an operator.

13. The system according to claim 10, wherein the command file includes a verification step that compares a reply to the instruction with an expectation to determine a discrepancy and displays an indicator in response to the discrepancy.

14. The system according to claim 10, wherein the command file incorporates the instruction in ASCII text using Motif code.

15. The system according to claim 10, wherein the driver software incorporates a software library.

16. The system according to claim 10, wherein the instruction in the command file verifies attributes of the information by one of confirming conformity and identifying discrepancy.

17. The method according to claim 1, wherein the input provider is a server simulator.

18. The system according to claim 10, wherein the input provider is a server simulator.

* * * * *